US011979733B2

(12) United States Patent
Mateos Sole et al.

(10) Patent No.: US 11,979,733 B2
(45) **Date of Patent: *May 7, 2024**

(54) METHODS AND APPARATUS FOR RENDERING AUDIO OBJECTS

(71) Applicants: DOLBY LABORATORIES LICENSING CORPORATION, San Francisco, CA (US); DOLBY INTERNATIONAL AB, Dublin (IE)

(72) Inventors: Antonio Mateos Sole, Barcelona (ES); Nicolas R. Tsingos, San Francisco, CA (US)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,658

(22) Filed: Jan. 20, 2023

(65) Prior Publication Data

US 2023/0269551 A1 Aug. 24, 2023

Related U.S. Application Data

(62) Division of application No. 17/329,094, filed on May 24, 2021, now Pat. No. 11,564,051, which is a (Continued)

(30) Foreign Application Priority Data

Mar. 28, 2013 (ES) ............................... ES201330461

(51) Int. Cl.

*H04R 5/00* (2006.01)
*H04S 3/00* (2006.01)
(Continued)

(52) U.S. Cl.

CPC ................ *H04S 7/30* (2013.01); *H04S 3/008* (2013.01); *H04S 5/005* (2013.01); (Continued)

(58) Field of Classification Search

CPC ............. H04S 2400/15; H04S 2400/13; H04S 2400/11; H04S 2400/01; H04S 5/005; H04S 3/008; H04S 7/30
(Continued)

(56) References Cited

U.S. PATENT DOCUMENTS 6,498,857 B1 * 12/2002 Sibbald .................... H04S 7/30 381/1
8,363,865 B1 1/2013 Bottum
(Continued)

FOREIGN PATENT DOCUMENTS

CN 101783886 7/2010
CN 102576562 7/2012
(Continued)

OTHER PUBLICATIONS

De Vries, D. et al "Auralization of Sound Fields by Wave Field Synthesis" presented at the 106th Convention, May 8-11, 1999, Munich, Germany, AES Monograph, 1999.
(Continued)

*Primary Examiner* — Ammar T Hamid

(57) ABSTRACT

Multiple virtual source locations may be defined for a volume within which audio objects can move. A set-up process for rendering audio data may involve receiving reproduction speaker location data and pre-computing gain values for each of the virtual sources according to the reproduction speaker location data and each virtual source location. The gain values may be stored and used during "run time," during which audio reproduction data are rendered for the speakers of the reproduction environment.
(Continued)

During run time, for each audio object, contributions from virtual source locations within an area or volume defined by the audio object position data and the audio object size data may be computed. A set of gain values for each output channel of the reproduction environment may be computed based, at least in part, on the computed contributions. Each output channel may correspond to at least one reproduction speaker of the reproduction environment.

3 Claims, 17 Drawing Sheets

Related U.S. Application Data division of application No. 16/868,861, filed on May 7, 2020, now Pat. No. 11,019,447, which is a division of application No. 15/894,626, filed on Feb. 12, 2018, now Pat. No. 10,652,684, which is a division of application No. 15/585,935, filed on May 3, 2017, now Pat. No. 9,992,600, which is a division of application No. 14/770,709, filed as application No. PCT/US2014/022793 on Mar. 10, 2014, now Pat. No. 9,674,630.

(60) Provisional application No. 61/833,581, filed on Jun. 11, 2013.

(51) Int. Cl.
*H04S 5/00* (2006.01)
*H04S 7/00* (2006.01)

(52) U.S. Cl.
CPC ....... *H04S 2400/01* (2013.01); *H04S 2400/11* (2013.01); *H04S 2400/13* (2013.01); *H04S 2400/15* (2013.01)

(58) Field of Classification Search
USPC ........................................................... 381/17
See application file for complete search history.

(56) References Cited

U.S. PATENT DOCUMENTS

| | | | |
|---|---|---|---|
| 2006/0206221 | A1 | 9/2006 | Metcalf |
| 2010/0092014 | A1 | 4/2010 | Strauss |
| 2010/0296678 | A1 | 11/2010 | Kuhn-Rahloff |
| 2011/0317841 | A1 | 12/2011 | Trammell |
| 2012/0016680 | A1 | 1/2012 | Thesing |
| 2014/0233917 | A1 | 8/2014 | Xiang |
| 2018/0007483 | A1 | 1/2018 | Chon |

FOREIGN PATENT DOCUMENTS

| | | | |
|---|---|---|---|
| CN | 103098003 | | 5/2013 |
| EP | 2056627 | | 5/2009 |
| JP | 2008109209 | | 5/2008 |
| JP | 2008-532374 | | 8/2008 |
| JP | 2010-506521 | | 2/2010 |
| JP | 2011-254195 | | 12/2011 |
| JP | 2012-527021 | | 11/2012 |
| JP | 2013521725 | | 6/2013 |
| RS | 1332 | U | 8/2013 |
| RU | 2376654 | | 12/2009 |
| RU | 2439717 | | 1/2012 |
| RU | 2443075 | | 2/2012 |
| RU | 2010150046 | | 6/2012 |
| UA | 107304 | C2 * | 12/2014 |
| WO | 00/18112 | | 3/2000 |
| WO | 2013/006322 | | 1/2013 |
| WO | 2013/006330 | | 1/2013 |
| WO | 2013/006338 | | 1/2013 |
| WO | 2014127019 | A1 | 8/2014 |

OTHER PUBLICATIONS

Pulkki, Ville "Compensating Displacement of Amplitude-Panned Virtual Sources" AES International Conference on Virtual, Synthetic and Entertainment Audio, Jun. 1, 2002, p. 4.
Pulkki, Ville "Uniform Spreading of Amplitude Panned Virtual Sources" IEEE Workshop on Applications of Signal Processing to Audio and Acoustics, Oct. 17, 1999, pp. 187-190.
Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.
Stanojevic, T. et al "Designing of TSS Halls" 13th International Congress on Acoustics, Yugoslavia, 1989.
Stanojevic, T. et al "The Total Surround Sound (TSS) Processor" SMPTE Journal, Nov. 1994.
Stanojevic, T. et al "The Total Surround Sound System", 86th AES Convention, Hamburg, Mar. 7-10, 1989.
Stanojevic, T. et al "TSS System and Live Performance Sound" 88th AES Convention, Montreux, Mar. 13-16, 1990.
Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers.
Stanojevic, Tomislav "3-D Sound in Future HDTV Projection Systems" presented at the 132nd SMPTE Technical Conference, Jacob K. Javits Convention Center, New York City, Oct. 13-17, 1990.
Stanojevic, Tomislav "Surround Sound for a New Generation of Theaters, Sound and Video Contractor" Dec. 20, 1995.
Stanojevic, Tomislav "Virtual Sound Sources in the Total Surround Sound System," SMPTE Conf. Proc., 1995, pp. 405-421.

* cited by examiner

METHODS AND APPARATUS FOR RENDERING AUDIO OBJECTS

CROSS REFERENCE TO RELATED APPLICATIONS

The present application is a divisional of U.S. patent application Ser. No. 17/329,094, filed May 24, 2021, which is a divisional of U.S. patent application Ser. No. 16/868,861 filed May 7, 2020, (now U.S. Pat. No. 11,019,447), which is a divisional of U.S. patent application Ser. No. 15/894,626, filed Feb. 12, 2018, (now U.S. Pat. No. 10,652,684) which is a divisional of U.S. patent application Ser. No. 15/585,935, filed May 3, 2017 (now U.S. Pat. No. 9,992,600), which is a divisional of U.S. patent application Ser. No. 14/770,709, filed Aug. 26, 2015 (now U.S. Pat. No. 9,674,630), which in turn is the U.S. national stage of International Patent Application No. PCT/US2014/022793, filed on Mar. 10, 2014. PCT/US2014/022793 claims priority to Spanish Patent Application No. P201330461, filed on Mar. 28, 2013 and U.S. Provisional Patent Application No. 61/833,581, filed on Jun. 11, 2013. Each of the above-named applications is hereby incorporated by reference in its entirety.

TECHNICAL FIELD

This disclosure relates to authoring and rendering of audio reproduction data. In particular, this disclosure relates to authoring and rendering audio reproduction data for reproduction environments such as cinema sound reproduction systems.

BACKGROUND

Since the introduction of sound with film in 1927, there has been a steady evolution of technology used to capture the artistic intent of the motion picture sound track and to replay it in a cinema environment. In the 1930s, synchronized sound on disc gave way to variable area sound on film, which was further improved in the 1940s with theatrical acoustic considerations and improved loudspeaker design, along with early introduction of multi-track recording and steerable replay (using control tones to move sounds). In the 1950s and 1960s, magnetic striping of film allowed multi-channel playback in theatre, introducing surround channels and up to five screen channels in premium theatres.

In the 1970s Dolby introduced noise reduction, both in post-production and on film, along with a cost-effective means of encoding and distributing mixes with 3 screen channels and a mono surround channel. The quality of cinema sound was further improved in the 1980s with Dolby Spectral Recording (SR) noise reduction and certification programs such as THX. Dolby brought digital sound to the cinema during the 1990s with a 5.1 channel format that provides discrete left, center and right screen channels, left and right surround arrays and a subwoofer channel for low-frequency effects. Dolby Surround 7.1, introduced in 2010, increased the number of surround channels by splitting the existing left and right surround channels into four "zones."

As the number of channels increases and the loudspeaker layout transitions from a planar two-dimensional (2D) array to a three-dimensional (3D) array including elevation, the tasks of authoring and rendering sounds are becoming increasingly complex. Improved methods and devices would be desirable.

SUMMARY

Some aspects of the subject matter described in this disclosure can be implemented in tools for rendering audio reproduction data that includes audio objects created without reference to any particular reproduction environment. As used herein, the term "audio object" may refer to a stream of audio signals and associated metadata. The metadata may indicate at least the position and apparent size of the audio object. However, the metadata also may indicate rendering constraint data, content type data (e.g. dialog, effects, etc.), gain data, trajectory data, etc. Some audio objects may be static, whereas others may have time-varying metadata: such audio objects may move, may change size and/or may have other properties that change over time.

When audio objects are monitored or played back in a reproduction environment, the audio objects may be rendered according to at least the position and size metadata. The rendering process may involve computing a set of audio object gain values for each channel of a set of output channels. Each output channel may correspond to one or more reproduction speakers of the reproduction environment.

Some implementations described herein involve a "set-up" process that may take place prior to rendering any particular audio objects. The set-up process, which also may be referred to herein as a first stage or Stage 1, may involve defining multiple virtual source locations in a volume within which the audio objects can move. As used herein, a "virtual source location" is a location of a static point source. According to such implementations, the set-up process may involve receiving reproduction speaker location data and pre-computing virtual source gain values for each of the virtual sources according to the reproduction speaker location data and the virtual source location. As used herein, the term "speaker location data" may include location data indicating the positions of some or all of the speakers of the reproduction environment. The location data may be provided as absolute coordinates of the reproduction speaker locations, for example Cartesian coordinates, spherical coordinates, etc. Alternatively, or additionally, location data may be provided as coordinates (e.g., for example Cartesian coordinates or angular coordinates) relative to other reproduction environment locations, such as acoustic "sweet spots" of the reproduction environment.

In some implementations, the virtual source gain values may be stored and used during "run time," during which audio reproduction data are rendered for the speakers of the reproduction environment. During run time, for each audio object, contributions from virtual source locations within an area or volume defined by the audio object position data and the audio object size data may be computed. The process of computing contributions from virtual source locations may involve computing a weighted average of multiple pre-computed virtual source gain values, determined during the set-up process, for virtual source locations that are within an audio object area or volume defined by the audio object's size and location. A set of audio object gain values for each output channel of the reproduction environment may be computed based, at least in part, on the computed virtual source contributions. Each output channel may correspond to at least one reproduction speaker of the reproduction environment.

Accordingly, some methods described herein involve receiving audio reproduction data that includes one or more audio objects. The audio objects may include audio signals and associated metadata. The metadata may include at least audio object position data and audio object size data. The methods may involve computing contributions from virtual sources within an audio object area or volume defined by the audio object position data and the audio object size data. The methods may involve computing a set of audio object gain values for each of a plurality of output channels based, at least in part, on the computed contributions. Each output channel may correspond to at least one reproduction speaker of a reproduction environment. For example, the reproduction environment may be a cinema sound system environment.

The process of computing contributions from virtual sources may involve computing a weighted average of virtual source gain values from the virtual sources within the audio object area or volume. The weights for the weighted average may depend on the audio object's position, the audio object's size and/or each virtual source location within the audio object area or volume.

The methods may also involve receiving reproduction environment data including reproduction speaker location data. The methods may also involve defining a plurality of virtual source locations according to the reproduction environment data and computing, for each of the virtual source locations, a virtual source gain value for each of the plurality of output channels. In some implementations, each of the virtual source locations may correspond to a location within the reproduction environment. However, in some implementations at least some of the virtual source locations may correspond to locations outside of the reproduction environment.

In some implementations, the virtual source locations may be spaced uniformly along x, y and z axes. However, in some implementations the spacing may not be the same in all directions. For example, the virtual source locations may have a first uniform spacing along x and y axes and a second uniform spacing along a z axis. The process of computing the set of audio object gain values for each of the plurality of output channels may involve independent computations of contributions from virtual sources along the x, y and z axes. In alternative implementations, the virtual source locations may be spaced non-uniformly.

In some implementations, the process of computing the audio object gain value for each of the plurality of output channels may involve determining a gain value ($g_l(x_o,y_o,z_o;s)$) for an audio object of size (s) to be rendered at location $x_o,y_o,z_o$. For example, the audio object gain value ($g_l(x_o,y_o,z_o;s)$) may be expressed as:

$$\left[\sum_{x_{vs},y_{vs},z_{vs}} [w(x_{vs}, y_{vs}, z_{vs}; x_o, y_o, z_o; s) g_l(x_{vs}, y_{vs}, z_{vs})]^p\right]^{1/p},$$

wherein ($x_{vs}$, $y_{vs}$, $z_{vs}$) represents a virtual source location, $g_l(x_{vs}, y_{vs}, z_{vs})$ represents a gain value for channel l for the virtual source location $x_{vs}$, $y_{vs}$, $z_{vs}$ and $w(x_{vs}, y_{vs}, z_{vs}; x_o, y_o, z_o;s)$ represents one or more weight functions for $g_l(x_{vs}, y_{vs}, z_{vs})$ determined, at least in part, based on the location ($x_o$, $y_o$, $z_o$) of the audio object, the size (s) of the audio object and the virtual source location ($x_{vs}$, $y_{vs}$, $z_{vs}$).

According to some such implementations, $g_l(x_{vs}, y_{vs}, z_{vs})=g_l(x_{vs})g_l(y_{vs})g_l(z_{vs})$, wherein $g_l(x_{vs})$, $g_l(y_{vs})$ and $g_l(z_{vs})$ represent independent gain functions of x, y and z. In some such implementations, the weight functions may factor as:

$$w(x_{vs},y_{vs},z_{vs};x_o,y_o,z_o;s)=w_x(x_{vs};x_o;s)w_y(y_{vs};y_o;s)w_z(z_{vs};z_o;s),$$

wherein $w_x(x_{vs}; x_o; s)$, $w_y(y_{vs}; y_o; s)$ and $w_z(z_{vs};z_o; s)$ represent independent weight functions of $x_{vs}$, $y_{vs}$, and $z_{vs}$. According to some such implementations, p may be a function of audio object size (s).

Some such methods may involve storing computed virtual source gain values in a memory system. The process of computing contributions from virtual sources within the audio object area or volume may involve retrieving, from the memory system, computed virtual source gain values corresponding to an audio object position and size and interpolating between the computed virtual source gain values. The process of interpolating between the computed virtual source gain values may involve: determining a plurality of neighboring virtual source locations near the audio object position; determining computed virtual source gain values for each of the neighboring virtual source locations; determining a plurality of distances between the audio object position and each of the neighboring virtual source locations; and interpolating between the computed virtual source gain values according to the plurality of distances.

In some implementations, the reproduction environment data may include reproduction environment boundary data. The method may involve determining that an audio object area or volume includes an outside area or volume outside of a reproduction environment boundary and applying a fade-out factor based, at least in part, on the outside area or volume. Some methods may involve determining that an audio object may be within a threshold distance from a reproduction environment boundary and providing no speaker feed signals to reproduction speakers on an opposing boundary of the reproduction environment. In some implementations, an audio object area or volume may be a rectangle, a rectangular prism, a circle, a sphere, an ellipse and/or an ellipsoid.

Some methods may involve decorrelating at least some of the audio reproduction data. For example, the methods may involve decorrelating audio reproduction data for audio objects having an audio object size that exceeds a threshold value.

Alternative methods are described herein. Some such methods involve receiving reproduction environment data including reproduction speaker location data and reproduction environment boundary data, and receiving audio reproduction data including one or more audio objects and associated metadata. The metadata may include audio object position data and audio object size data. The methods may involve determining that an audio object area or volume, defined by the audio object position data and the audio object size data, includes an outside area or volume outside of a reproduction environment boundary and determining a fade-out factor based, at least in part, on the outside area or volume. The methods may involve computing a set of gain values for each of a plurality of output channels based, at least in part, on the associated metadata and the fade-out factor. Each output channel may correspond to at least one reproduction speaker of the reproduction environment. The fade-out factor may be proportional to the outside area.

The methods also may involve determining that an audio object may be within a threshold distance from a reproduction environment boundary and providing no speaker feed signals to reproduction speakers on an opposing boundary of the reproduction environment.

The methods also may involve computing contributions from virtual sources within the audio object area or volume. The methods may involve defining a plurality of virtual source locations according to the reproduction environment data and computing, for each of the virtual source locations, a virtual source gain for each of a plurality of output channels. The virtual source locations may or may not be spaced uniformly, depending on the particular implementation.

Some implementations may be manifested in one or more non-transitory media having software stored thereon. The software may include instructions for controlling one or more devices for receiving audio reproduction data including one or more audio objects. The audio objects may include audio signals and associated metadata. The metadata may include at least audio object position data and audio object size data. The software may include instructions for computing, for an audio object from the one or more audio objects, contributions from virtual sources within an area or volume defined by the audio object position data and the audio object size data and computing a set of audio object gain values for each of a plurality of output channels based, at least in part, on the computed contributions. Each output channel may correspond to at least one reproduction speaker of a reproduction environment.

In some implementations, the process of computing contributions from virtual sources may involve computing a weighted average of virtual source gain values from the virtual sources within the audio object area or volume. Weights for the weighted average may depend on the audio object's position, the audio object's size and/or each virtual source location within the audio object area or volume.

The software may include instructions for receiving reproduction environment data including reproduction speaker location data. The software may include instructions for defining a plurality of virtual source locations according to the reproduction environment data and computing, for each of the virtual source locations, a virtual source gain value for each of the plurality of output channels. Each of the virtual source locations may correspond to a location within the reproduction environment. In some implementations, at least some of the virtual source locations may correspond to locations outside of the reproduction environment.

According to some implementations, the virtual source locations may be spaced uniformly. In some implementations, the virtual source locations may have a first uniform spacing along x and y axes and a second uniform spacing along a z axis. The process of computing the set of audio object gain values for each of the plurality of output channels may involve independent computations of contributions from virtual sources along the x, y and z axes.

Various devices and apparatus are described herein. Some such apparatus may include an interface system and a logic system. The interface system may include a network interface. In some implementations, the apparatus may include a memory device. The interface system may include an interface between the logic system and the memory device.

The logic system may be adapted for receiving, from the interface system, audio reproduction data including one or more audio objects. The audio objects may include audio signals and associated metadata. The metadata may include at least audio object position data and audio object size data. The logic system may be adapted for computing, for an audio object from the one or more audio objects, contributions from virtual sources within an audio object area or volume defined by the audio object position data and the audio object size data. The logic system may be adapted for computing a set of audio object gain values for each of a plurality of output channels based, at least in part, on the computed contributions. Each output channel may correspond to at least one reproduction speaker of a reproduction environment.

The process of computing contributions from virtual sources may involve computing a weighted average of virtual source gain values from the virtual sources within the audio object area or volume. Weights for the weighted average may depend on the audio object's position, the audio object's size and each virtual source location within the audio object area or volume. The logic system may be adapted for receiving, from the interface system, reproduction environment data including reproduction speaker location data.

The logic system may be adapted for defining a plurality of virtual source locations according to the reproduction environment data and computing, for each of the virtual source locations, a virtual source gain value for each of the plurality of output channels. Each of the virtual source locations may correspond to a location within the reproduction environment. However, in some implementations, at least some of the virtual source locations may correspond to locations outside of the reproduction environment. The virtual source locations may or may not be spaced uniformly, depending on the implementation. In some implementations, the virtual source locations may have a first uniform spacing along x and y axes and a second uniform spacing along a z axis. The process of computing the set of audio object gain values for each of the plurality of output channels may involve independent computations of contributions from virtual sources along the x, y and z axes.

The apparatus also may include a user interface. The logic system may be adapted for receiving user input, such as audio object size data, via the user interface. In some implementation, the logic system may be adapted for scaling the input audio object size data.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations have been described in terms of particular reproduction environments, the teachings herein are widely applicable to other known reproduction environments, as well as reproduction environments that may be introduced in the future. Moreover, the described implementations may be implemented in various authoring and/or rendering tools, which may be implemented in a variety of hardware, software, firmware, etc. Accordingly, the teachings of this disclosure are not intended to be limited to the implementations shown in the figures and/or described herein, but instead have wide applicability.

Figure 1:
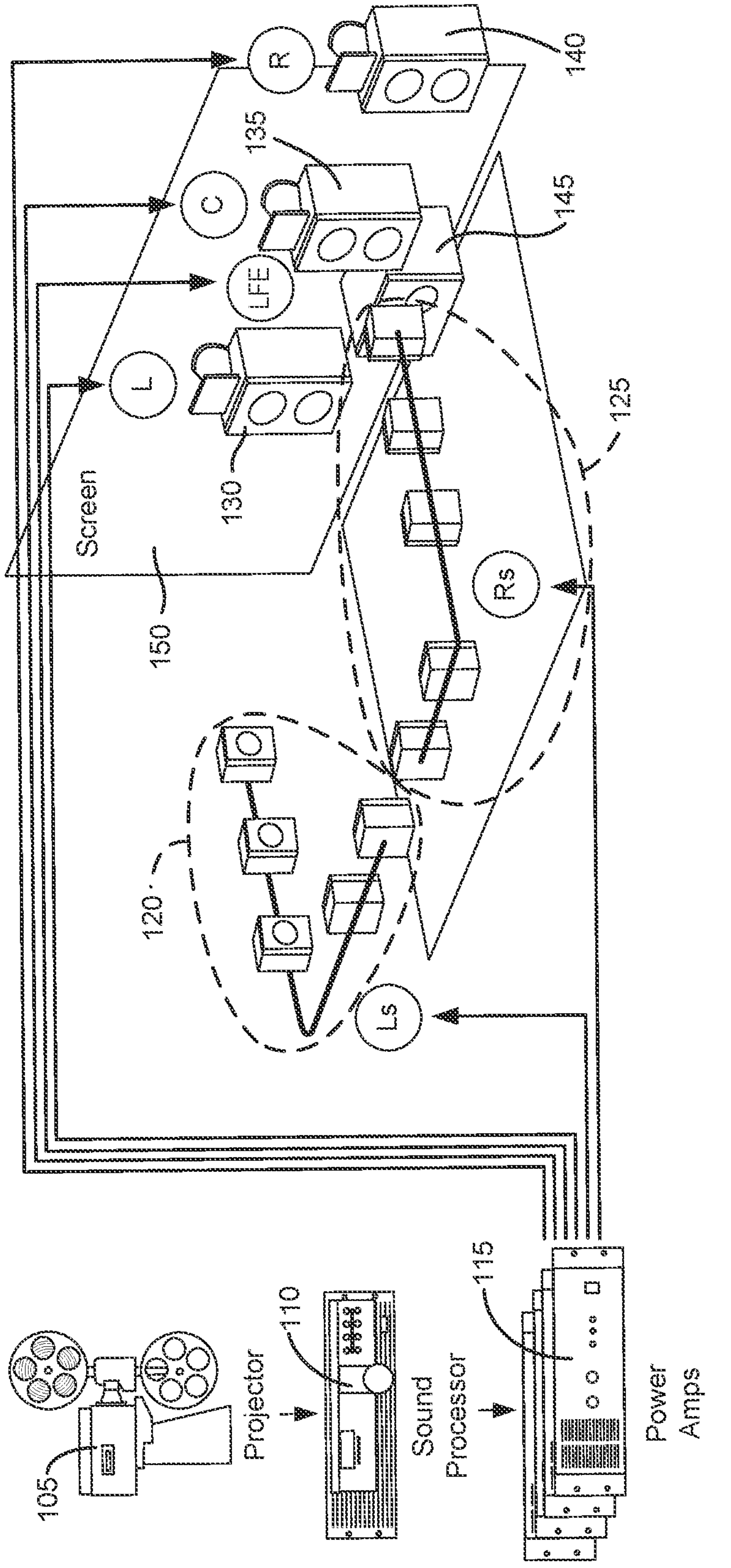
FIG. 1 shows an example of a reproduction environment having a Dolby Surround 5.1 configuration.

FIG. 1 shows an example of a reproduction environment having a Dolby Surround 5.1 configuration. Dolby Surround 5.1 was developed in the 1990s, but this configuration is still widely deployed in cinema sound system environments. A projector 105 may be configured to project video images, e.g. for a movie, on the screen 150. Audio reproduction data may be synchronized with the video images and processed by the sound processor 110. The power amplifiers 115 may provide speaker feed signals to speakers of the reproduction environment 100.

The Dolby Surround 5.1 configuration includes left surround array 120 and right surround array 125, each of which includes a group of speakers that are gang-driven by a single channel. The Dolby Surround 5.1 configuration also includes separate channels for the left screen channel 130, the center screen channel 135 and the right screen channel 140. A separate channel for the subwoofer 145 is provided for low-frequency effects (LFE).

Figure 2:
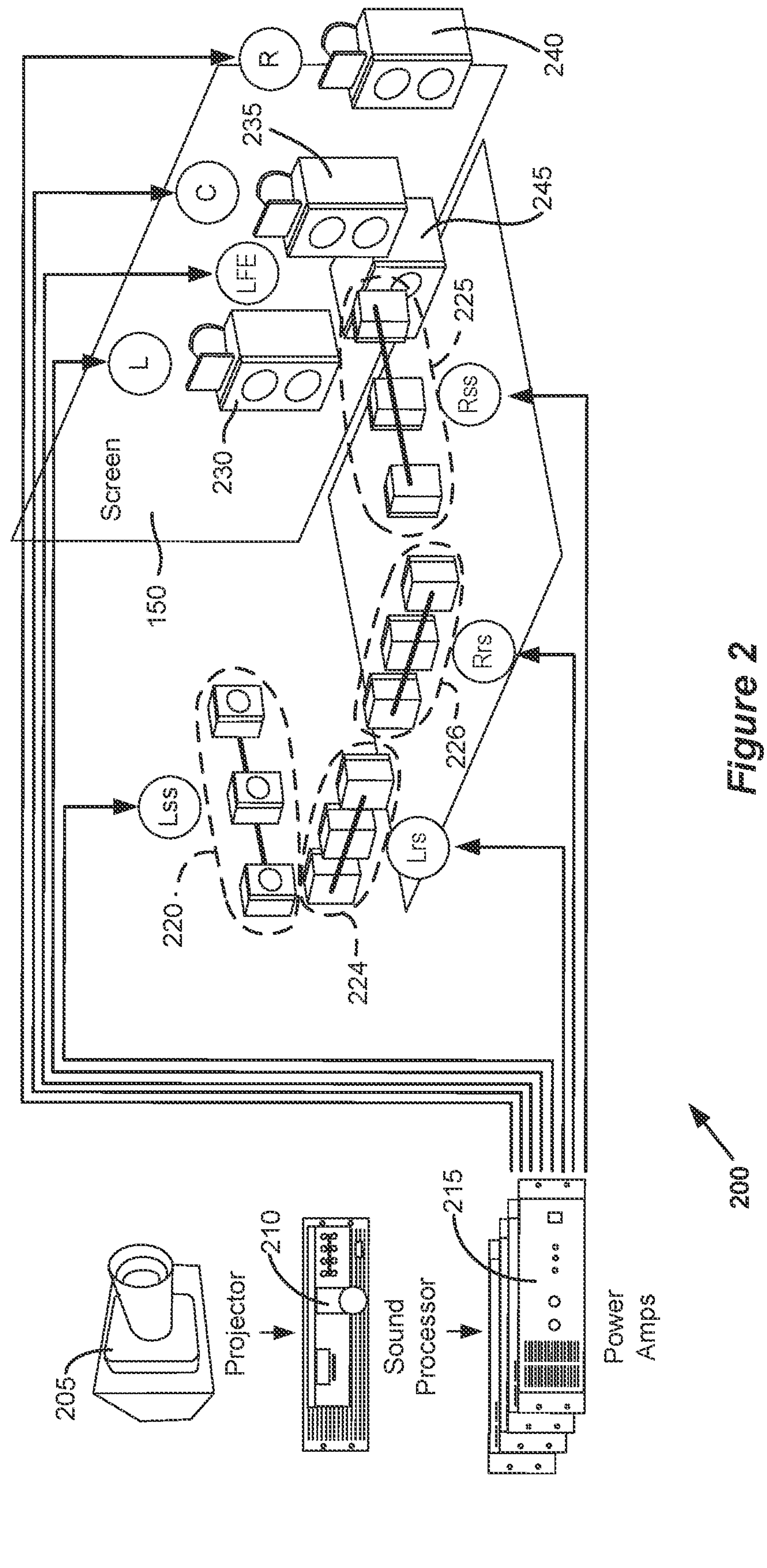
FIG. 2 shows an example of a reproduction environment having a Dolby Surround 7.1 configuration.

In 2010, Dolby provided enhancements to digital cinema sound by introducing Dolby Surround 7.1. FIG. 2 shows an example of a reproduction environment having a Dolby Surround 7.1 configuration. A digital projector 205 may be configured to receive digital video data and to project video images on the screen 150. Audio reproduction data may be processed by the sound processor 210. The power amplifiers 215 may provide speaker feed signals to speakers of the reproduction environment 200.

The Dolby Surround 7.1 configuration includes the left side surround array 220 and the right side surround array 225, each of which may be driven by a single channel. Like Dolby Surround 5.1, the Dolby Surround 7.1 configuration includes separate channels for the left screen channel 230, the center screen channel 235, the right screen channel 240 and the subwoofer 245. However, Dolby Surround 7.1 increases the number of surround channels by splitting the left and right surround channels of Dolby Surround 5.1 into four zones: in addition to the left side surround array 220 and the right side surround array 225, separate channels are included for the left rear surround speakers 224 and the right rear surround speakers 226. Increasing the number of surround zones within the reproduction environment 200 can significantly improve the localization of sound.

In an effort to create a more immersive environment, some reproduction environments may be configured with increased numbers of speakers, driven by increased numbers of channels. Moreover, some reproduction environments may include speakers deployed at various elevations, some of which may be above a seating area of the reproduction environment.

Figure 3:
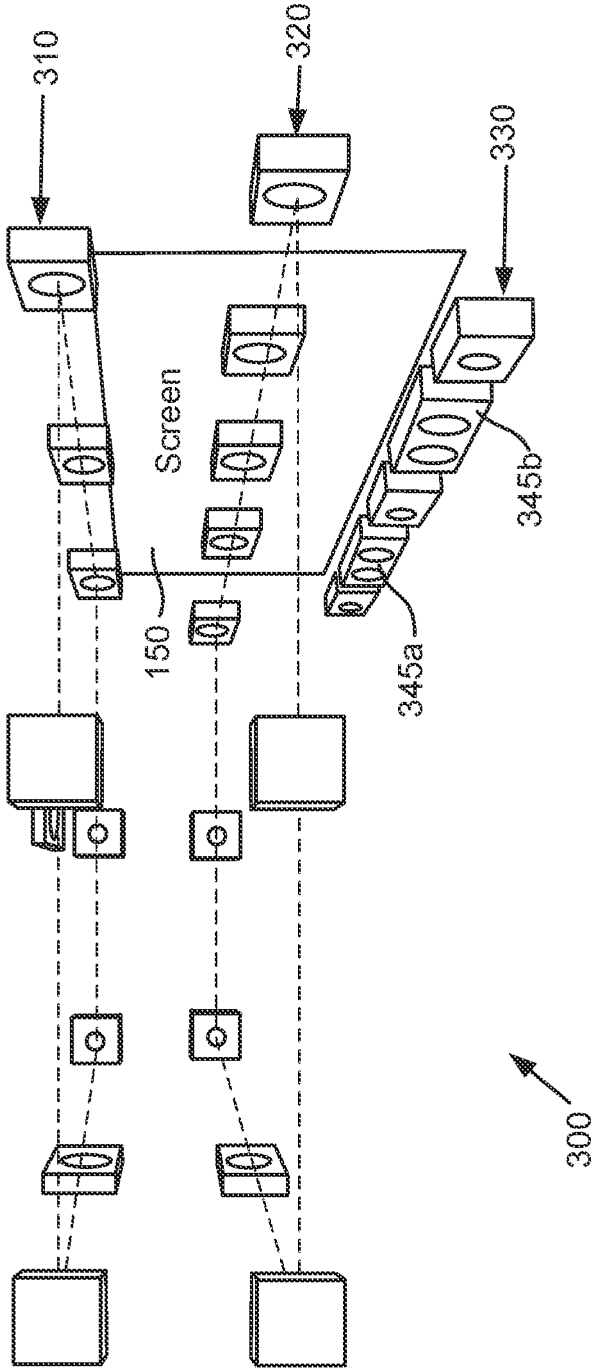
FIG. 3 shows an example of a reproduction environment having a Hamasaki 22.2 surround sound configuration.

FIG. 3 shows an example of a reproduction environment having a Hamasaki 22.2 surround sound configuration. Hamasaki 22.2 was developed at NHK Science & Technology Research Laboratories in Japan as the surround sound component of Ultra High Definition Television. Hamasaki 22.2 provides 24 speaker channels, which may be used to drive speakers arranged in three layers. Upper speaker layer 310 of reproduction environment 300 may be driven by 9 channels. Middle speaker layer 320 may be driven by 10 channels. Lower speaker layer 330 may be driven by 5 channels, two of which are for the subwoofers **345*a* and 345*b***.

Accordingly, the modern trend is to include not only more speakers and more channels, but also to include speakers at differing heights. As the number of channels increases and the speaker layout transitions from a 2D array to a 3D array, the tasks of positioning and rendering sounds becomes increasingly difficult. Accordingly, the present assignee has developed various tools, as well as related user interfaces, which increase functionality and/or reduce authoring complexity for a 3D audio sound system. Some of these tools are described in detail with reference to FIGS. 5A-19D of U.S. Provisional Patent Application No. 61/636,102, filed on Apr. 20, 2012 and entitled "System and Tools for Enhanced 3D Audio Authoring and Rendering" (the "Authoring and Rendering Application") which is hereby incorporated by reference.

Figure 4A:
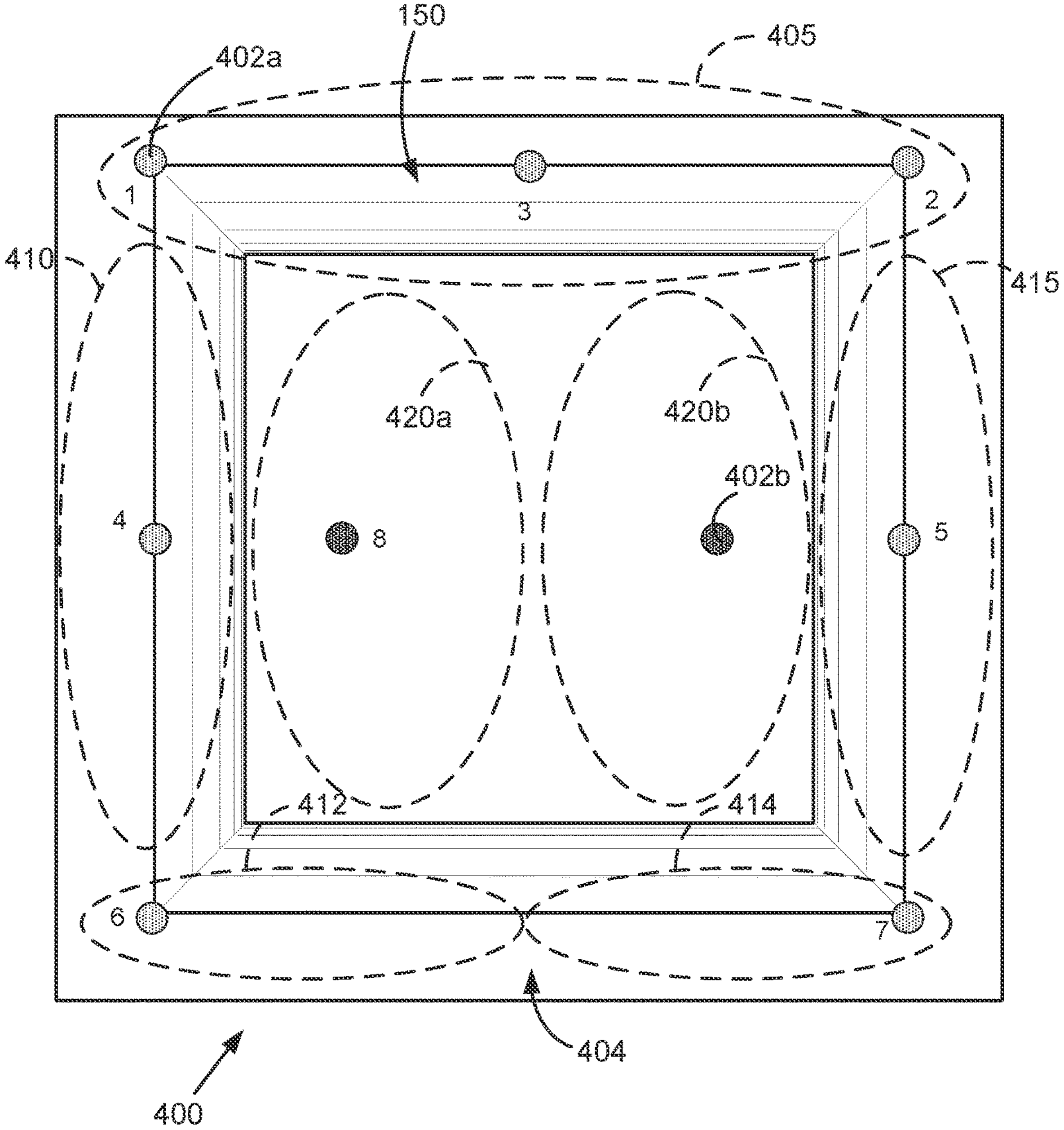
FIG. 4A shows an example of a graphical user interface (GUI) that portrays speaker zones at varying elevations in a virtual reproduction environment.

FIG. 4A shows an example of a graphical user interface (GUI) that portrays speaker zones at varying elevations in a virtual reproduction environment. GUI 400 may, for example, be displayed on a display device according to instructions from a logic system, according to signals received from user input devices, etc. Some such devices are described below with reference to FIG. 10.

As used herein with reference to virtual reproduction environments such as the virtual reproduction environment 404, the term "speaker zone" generally refers to a logical construct that may or may not have a one-to-one correspondence with a reproduction speaker of an actual reproduction environment. For example, a "speaker zone location" may or may not correspond to a particular reproduction speaker location of a cinema reproduction environment. Instead, the term "speaker zone location" may refer generally to a zone of a virtual reproduction environment. In some implementations, a speaker zone of a virtual reproduction environment may correspond to a virtual speaker, e.g., via the use of virtualizing technology such as Dolby Headphone,™ (sometimes referred to as Mobile Surround™), which creates a virtual surround sound environment in real time using a set of two-channel stereo headphones. In GUI 400, there are seven speaker zones 402*a* at a first elevation and two speaker zones 402*b* at a second elevation, making a total of nine speaker zones in the virtual reproduction environment 404. In this example, speaker zones 1-3 are in the front area 405 of the virtual reproduction environment 404. The front area 405 may correspond, for example, to an area of a cinema reproduction environment in which a screen 150 is located, to an area of a home in which a television screen is located, etc.

Here, speaker zone 4 corresponds generally to speakers in the left area 410 and speaker zone 5 corresponds to speakers in the right area 415 of the virtual reproduction environment 404. Speaker zone 6 corresponds to a left rear area 412 and speaker zone 7 corresponds to a right rear area 414 of the virtual reproduction environment 404. Speaker zone 8 corresponds to speakers in an upper area 420*a* and speaker zone 9 corresponds to speakers in an upper area 420*b*, which may be a virtual ceiling area. Accordingly, and as described in more detail in the Authoring and Rendering Application, the locations of speaker zones 1-9 that are shown in FIG. 4A may or may not correspond to the locations of reproduction speakers of an actual reproduction environment. Moreover, other implementations may include more or fewer speaker zones and/or elevations.

In various implementations described in the Authoring and Rendering Application, a user interface such as GUI 400 may be used as part of an authoring tool and/or a rendering tool. In some implementations, the authoring tool and/or rendering tool may be implemented via software stored on one or more non-transitory media. The authoring tool and/or rendering tool may be implemented (at least in part) by hardware, firmware, etc., such as the logic system and other devices described below with reference to FIG. 10. In some authoring implementations, an associated authoring tool may be used to create metadata for associated audio data. The metadata may, for example, include data indicating the position and/or trajectory of an audio object in a three-dimensional space, speaker zone constraint data, etc. The metadata may be created with respect to the speaker zones 402 of the virtual reproduction environment 404, rather than with respect to a particular speaker layout of an actual reproduction environment. A rendering tool may receive audio data and associated metadata, and may compute audio gains and speaker feed signals for a reproduction environment. Such audio gains and speaker feed signals may be computed according to an amplitude panning process, which can create a perception that a sound is coming from a position P in the reproduction environment. For example, speaker feed signals may be provided to reproduction speakers 1 through N of the reproduction environment according to the following equation:

$$x_i(t)=g_i x(t),\ i=1, \ldots N \qquad \text{(Equation 1)}$$

In Equation 1, $x_i(t)$ represents the speaker feed signal to be applied to speaker i, $g_i$ represents the gain factor of the corresponding channel, x(t) represents the audio signal and t represents time. The gain factors may be determined, for example, according to the amplitude panning methods described in Section 2, pages 3-4 of V. Pulkki, *Compensating Displacement of Amplitude-Panned Virtual Sources* (Audio Engineering Society (AES) International Conference on Virtual, Synthetic and Entertainment Audio), which is hereby incorporated by reference. In some implementations, the gains may be frequency dependent. In some implementations, a time delay may be introduced by replacing x(t) by x(t−Δt).

In some rendering implementations, audio reproduction data created with reference to the speaker zones 402 may be mapped to speaker locations of a wide range of reproduction environments, which may be in a Dolby Surround 5.1 configuration, a Dolby Surround 7.1 configuration, a Hamasaki 22.2 configuration, or another configuration. For example, referring to FIG. 2, a rendering tool may map audio reproduction data for speaker zones 4 and 5 to the left side surround array 220 and the right side surround array 225 of a reproduction environment having a Dolby Surround 7.1 configuration. Audio reproduction data for speaker zones 1, 2 and 3 may be mapped to the left screen channel 230, the right screen channel 240 and the center screen channel 235, respectively. Audio reproduction data for speaker zones 6 and 7 may be mapped to the left rear surround speakers 224 and the right rear surround speakers 226.

Figure 4B:
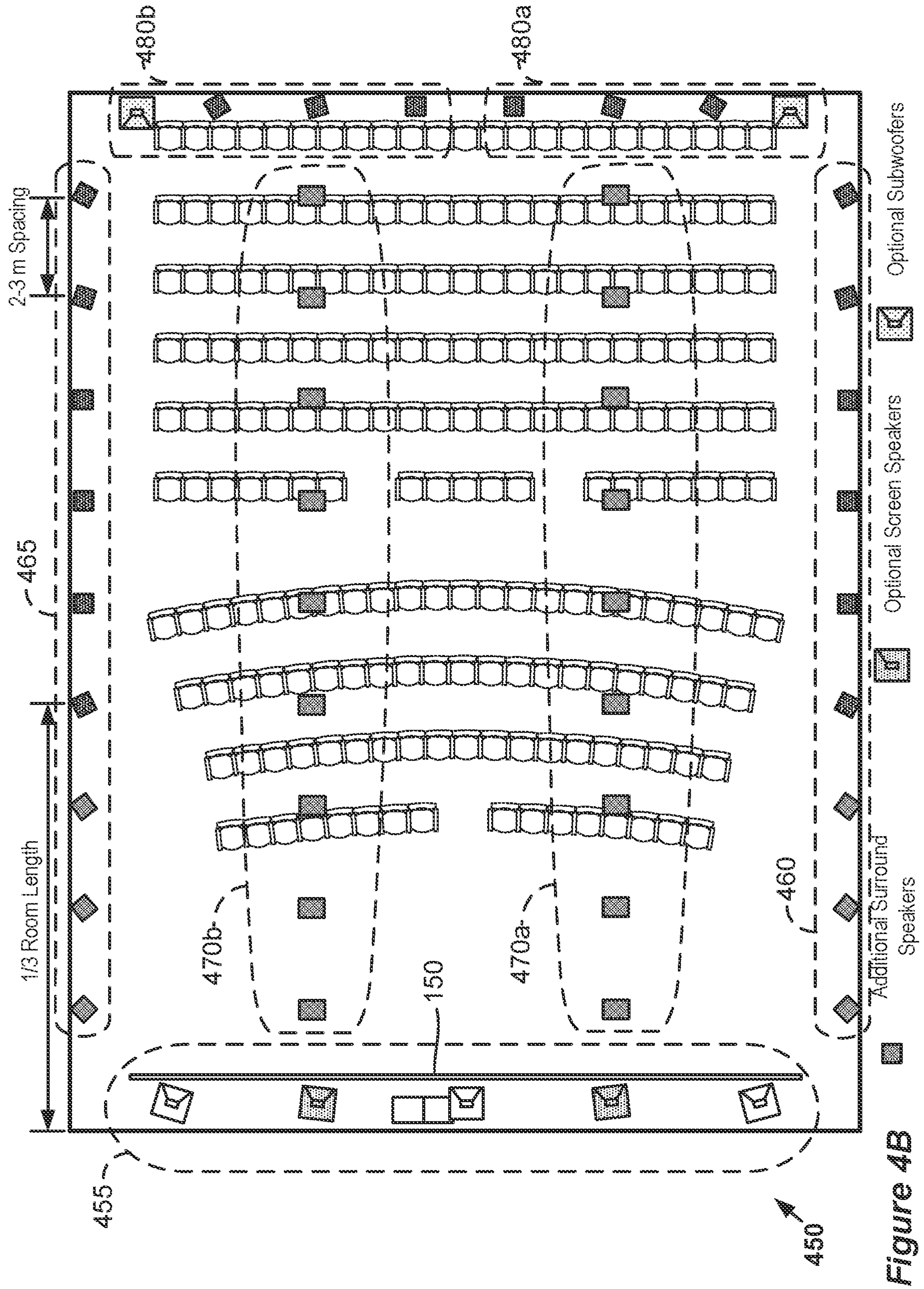
FIG. 4B shows an example of another reproduction environment.

FIG. 4B shows an example of another reproduction environment. In some implementations, a rendering tool may map audio reproduction data for speaker zones 1, 2 and 3 to corresponding screen speakers 455 of the reproduction environment 450. A rendering tool may map audio reproduction data for speaker zones 4 and 5 to the left side surround array 460 and the right side surround array 465 and may map audio reproduction data for speaker zones 8 and 9 to left overhead speakers 470*a* and right overhead speakers 470*b*. Audio reproduction data for speaker zones 6 and 7 may be mapped to left rear surround speakers 480*a* and right rear surround speakers 480*b*.

In some authoring implementations, an authoring tool may be used to create metadata for audio objects. As noted above, the term "audio object" may refer to a stream of audio data signals and associated metadata. The metadata may indicate the 3D position of the audio object, the apparent size of the audio object, rendering constraints as well as content type (e.g. dialog, effects), etc. Depending on the implementation, the metadata may include other types of data, such as gain data, trajectory data, etc. Some audio objects may be static, whereas others may move. Audio object details may be authored or rendered according to the associated metadata which, among other things, may indicate the position of the audio object in a three-dimensional space at a given point in time. When audio objects are monitored or played back in a reproduction environment, the audio objects may be rendered according to their position and size metadata according to the reproduction speaker layout of the reproduction environment.

Figure 5A:
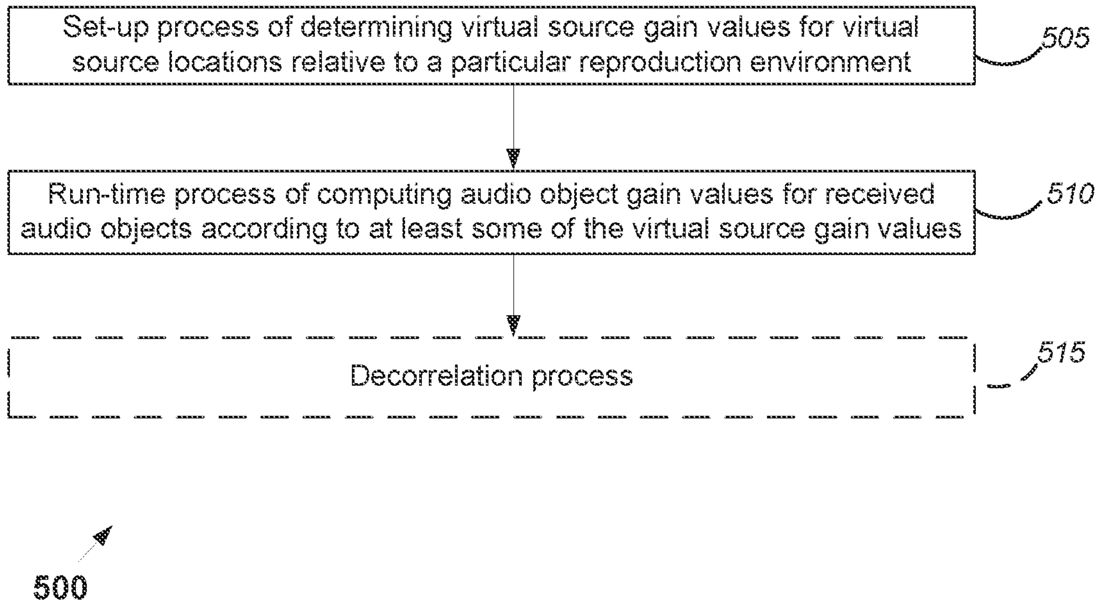
FIG. 5A is a flow diagram that provides an overview of an audio processing method.

FIG. 5A is a flow diagram that provides an overview of an audio processing method. More detailed examples are described below with reference to FIG. 5B et seq. These methods may include more or fewer blocks than shown and described herein and are not necessarily performed in the order shown herein. These methods may be performed, at least in part, by an apparatus such as those shown in FIGS. 10-11B and described below. In some embodiments, these methods may be implemented, at least in part, by software stored in one or more non-transitory media. The software may include instructions for controlling one or more devices to perform the methods described herein.

Figure 6A:
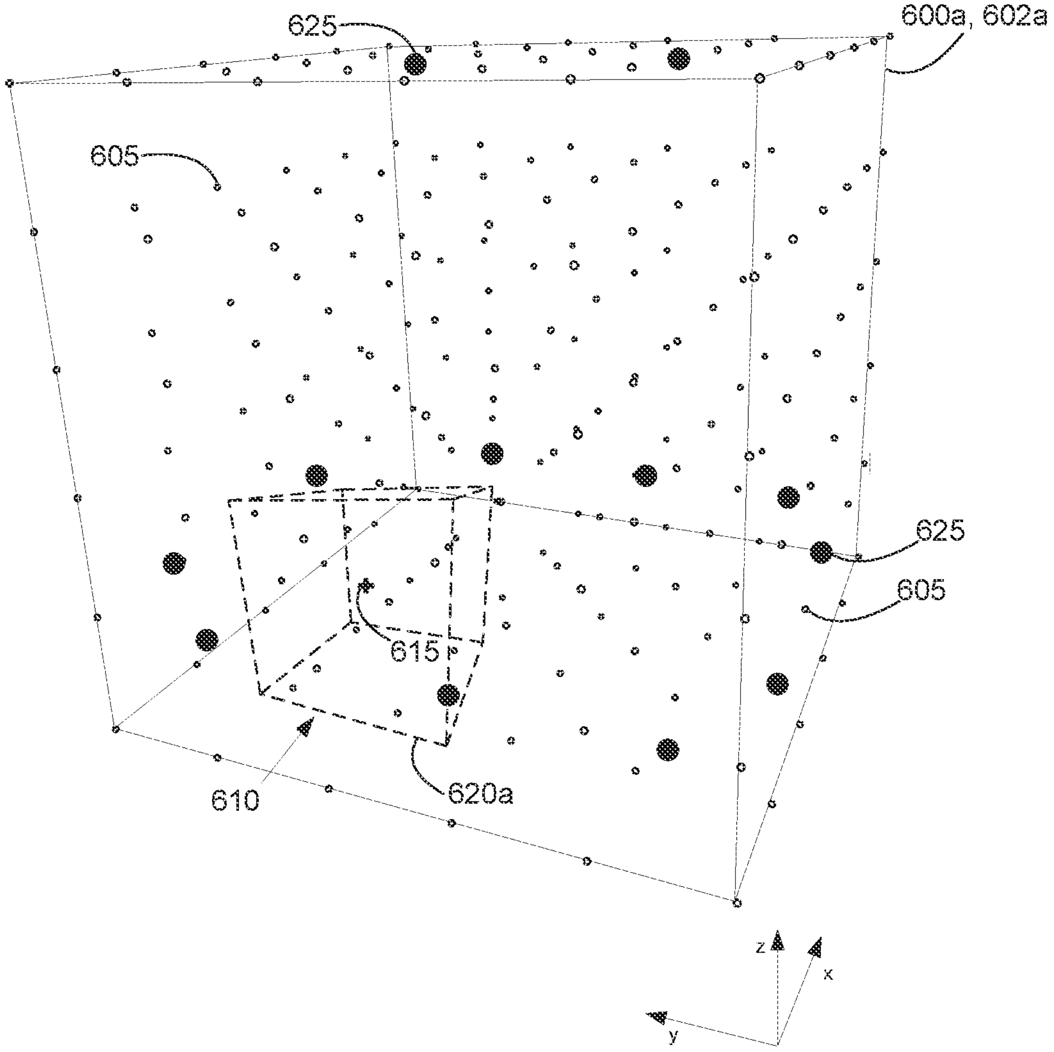
FIG. 6A shows an example of virtual source locations relative to a reproduction environment.

In the example shown in FIG. 5A, method 500 begins with a set-up process of determining virtual source gain values for virtual source locations relative to a particular reproduction environment (block 505). FIG. 6A shows an example of virtual source locations relative to a reproduction environment. For example, block 505 may involve determining virtual source gain values of the virtual source locations 605 relative to the reproduction speaker locations 625 of the reproduction environment 600*a*. The virtual source locations 605 and the reproduction speaker locations 625 are merely examples. In the example shown in FIG. 6A, the virtual source locations 605 are spaced uniformly along x, y and z axes. However, in alternative implementations, the virtual source locations 605 may be spaced differently. For example, in some implementations the virtual source locations 605 may have a first uniform spacing along the x and y axes and a second uniform spacing along the z axis. In other implementations, the virtual source locations 605 may be spaced non-uniformly.

In the example shown in FIG. 6A, the reproduction environment 600*a* and the virtual source volume 602*a* are co-extensive, such that each of the virtual source locations 605 corresponds to a location within the reproduction environment 600*a*. However, in alternative implementations, the reproduction environment 600 and the virtual source volume 602 may not be co-extensive. For example, at least some of the virtual source locations 605 may correspond to locations outside of the reproduction environment 600.

Figure 6B:
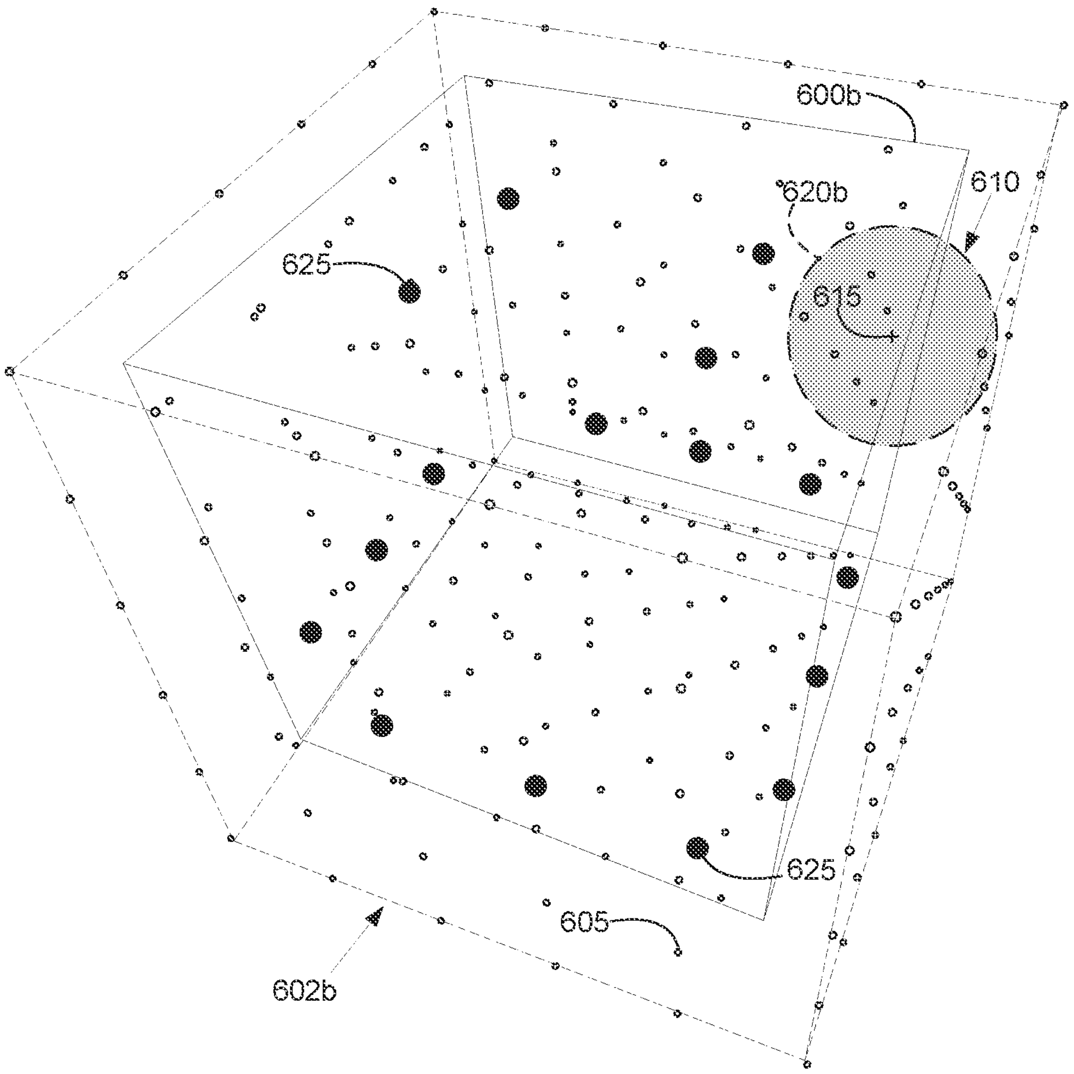
FIG. 6B shows an alternative example of virtual source locations relative to a reproduction environment.

FIG. 6B shows an alternative example of virtual source locations relative to a reproduction environment. In this example, the virtual source volume 602*b* extends outside of the reproduction environment 600*b*.

Returning to FIG. 5A, in this example, the set-up process of block 505 takes place prior to rendering any particular audio objects. In some implementations, the virtual source gain values determined in block 505 may be stored in a storage system. The stored virtual source gain values maybe used during a "run time" process of computing audio object gain values for received audio objects according to at least some of the virtual source gain values (block 510). For example, block 510 may involve computing the audio object gain values based, at least in part, on virtual source gain values corresponding to virtual source locations that are within an audio object area or volume.

In some implementations, method 500 may include optional block 515, which involves decorrelating audio data. Block 515 may be part of a run-time process. In some such implementations, block 515 may involve convolution in the frequency domain. For example, block 515 may involve applying a finite impulse response ("FIR") filter for each speaker feed signal.

In some implementations, the processes of block 515 may or may not be performed, depending on an audio object size and/or an author's artistic intention. According to some such implementations, an authoring tool may link audio object size with decorrelation by indicating (e.g., via a decorrelation flag included in associated metadata) that decorrelation should be turned on when the audio object size is greater than or equal to a size threshold value and that decorrelation should be turned off if the audio object size is below the size threshold value. In some implementations, decorrelation may be controlled (e.g., increased, decreased or disabled) according to user input regarding the size threshold value and/or other input values.

Figure 5B:
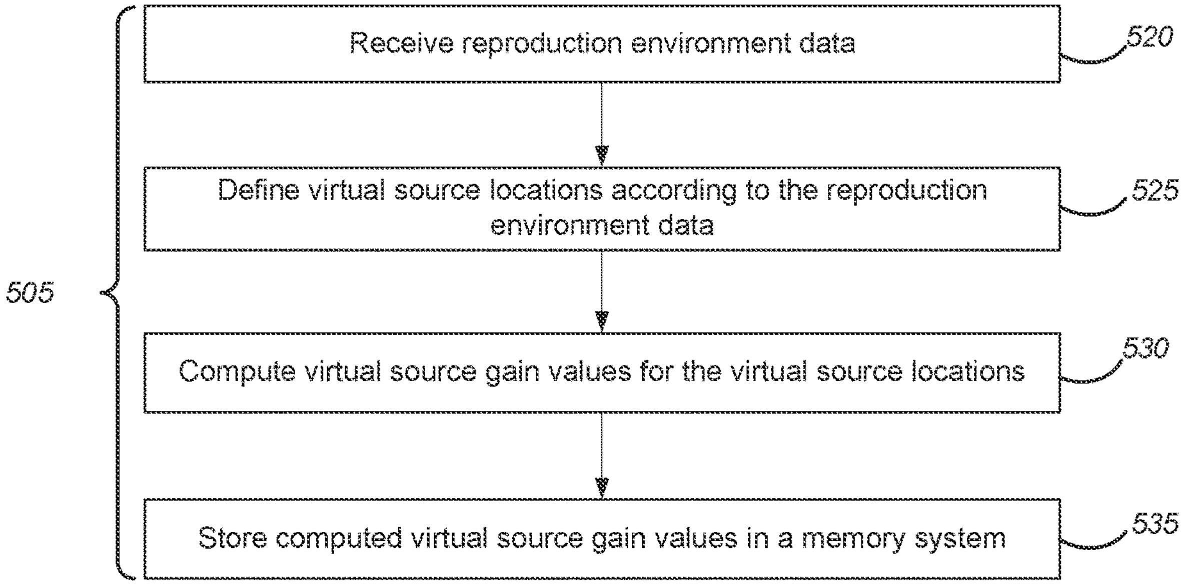
FIG. 5B is a flow diagram that provides an example of a set-up process.

FIG. 5B is a flow diagram that provides an example of a set-up process. Accordingly, all of the blocks shown in FIG. 5B are examples of processes that may be performed in block 505 of FIG. 5A. Here, the set-up process begins with the receipt of reproduction environment data (block 520). The reproduction environment data may include reproduction speaker location data. The reproduction environment data also may include data representing boundaries of a reproduction environment, such as walls, ceiling, etc. If the reproduction environment is a cinema, the reproduction environment data also may include an indication of a movie screen location.

The reproduction environment data also may include data indicating a correlation of output channels with reproduction speakers of a reproduction environment. For example, the reproduction environment may have a Dolby Surround 7.1 configuration such as that shown in FIG. 2 and described above. Accordingly, the reproduction environment data also may include data indicating a correlation between an Lss channel and the left side surround speakers 220, between an Lrs channel and the left rear surround speakers 224, etc.

In this example, block 525 involves defining virtual source locations 605 according to the reproduction environment data. The virtual source locations 605 may be defined within a virtual source volume. In some implementations, the virtual source volume may correspond with a volume within which audio objects can move. As shown in FIGS. 6A and 6B, in some implementations the virtual source volume 602 may be co-extensive with a volume of the reproduction environment 600, whereas in other implementations at least some of the virtual source locations 605 may correspond to locations outside of the reproduction environment 600.

Moreover, the virtual source locations 605 may or may not be spaced uniformly within the virtual source volume 602, depending on the particular implementation. In some implementations, the virtual source locations 605 may be spaced uniformly in all directions. For example, the virtual source locations 605 may form a rectangular grid of $N_x$ by $N_y$ by $N_z$, virtual source locations 605. In some implementations, the value of N may be in the range of 5 to 100. The value of N may depend, at least in part, on the number of reproduction speakers in the reproduction environment: it may be desirable to include two or more virtual source locations 605 between each reproduction speaker location.

In other implementations, the virtual source locations 605 may have a first uniform spacing along x and y axes and a second uniform spacing along a z axis. The virtual source locations 605 may form a rectangular grid of $N_x$ by $N_y$ by $N_z$, virtual source locations 605. For example, in some implementations there may be fewer virtual source locations 605 along the z axis than along the x or y axes. In some such implementations, the value of N may be in the range of 10 to 100, whereas the value of M may be in the range of 5 to 10.

In this example, block 530 involves computing virtual source gain values for each of the virtual source locations 605. In some implementations, block 530 involves computing, for each of the virtual source locations 605, virtual source gain values for each channel of a plurality of output channels of the reproduction environment. In some implementations, block 530 may involve applying a vector-based amplitude panning ("VBAP") algorithm, a pairwise panning algorithm or a similar algorithm to compute gain values for point sources located at each of the virtual source locations 605. In other implementations, block 530 may involve applying a separable algorithm, to compute gain values for point sources located at each of the virtual source locations 605. As used herein, a "separable" algorithm is one for which the gain of a given speaker can be expressed as a product of two or more factors that may be computed separately for each of the coordinates of the virtual source location. Examples include algorithms implemented in various existing mixing console panners, including but not limited to the Pro Tools™ software and panners implemented in digital film consoles provided by AMS Neve. Some two-dimensional examples are provided below.

Figure 6C:
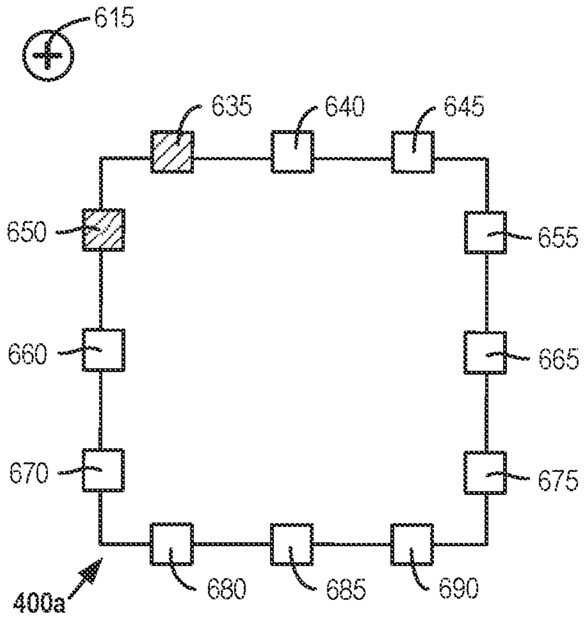
FIGS. 6C-6F show examples of applying near-field and far-field panning techniques to audio objects at different locations.

FIGS. 6C-6F show examples of applying near-field and far-field panning techniques to audio objects at different locations. Referring first to FIG. 6C, the audio object is substantially outside of the virtual reproduction environment 400*a*. Therefore, one or more far-field panning methods will be applied in this instance. In some implementations, the far-field panning methods may be based on vector-based amplitude panning (VBAP) equations that are known by those of ordinary skill in the art. For example, the far-field panning methods may be based on the VBAP equations described in Section 2.3, page 4 of V. Pulkki, Compensating Displacement of Amplitude-Panned Virtual Sources (AES International Conference on Virtual, Synthetic and Entertainment Audio), which is hereby incorporated by reference. In alternative implementations, other methods may be used for panning far-field and near-field audio objects, e.g., methods that involve the synthesis of corresponding acoustic planes or spherical wave. D. de Vries, Wave Field Synthesis (AES Monograph 1999), which is hereby incorporated by reference, describes relevant methods.

Figure 6D:
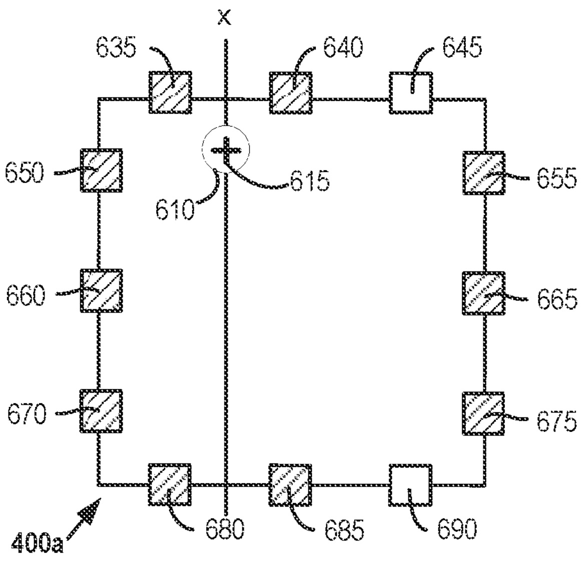
Figure 6E:
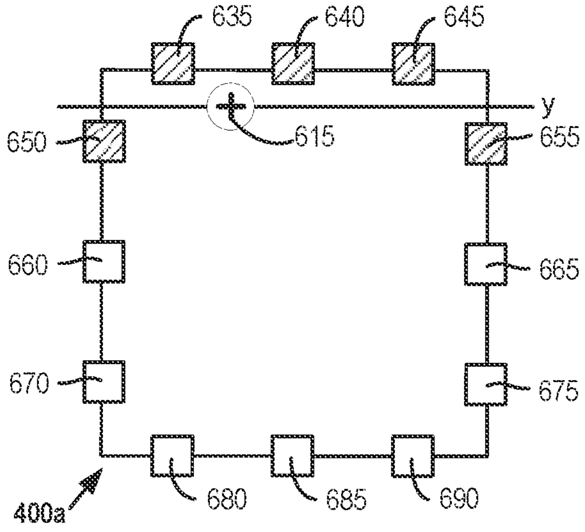
Figure 6F:
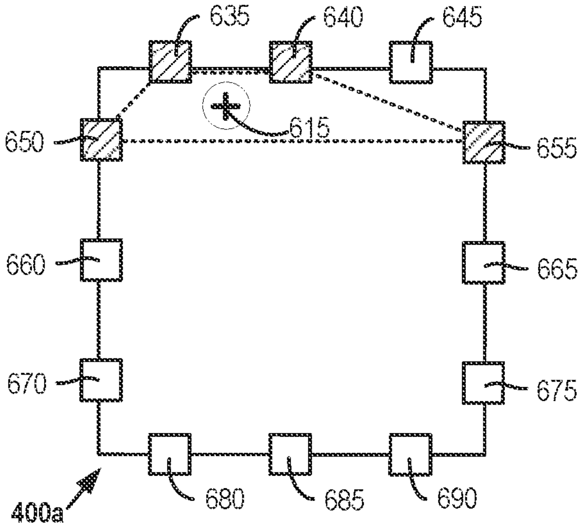

Referring now to FIG. 6D, the audio object 610 is inside of the virtual reproduction environment 400*a*. Therefore, one or more near-field panning methods will be applied in this instance. Some such near-field panning methods will use a number of speaker zones enclosing the audio object 610 in the virtual reproduction environment 400*a*.

Figure 6G:
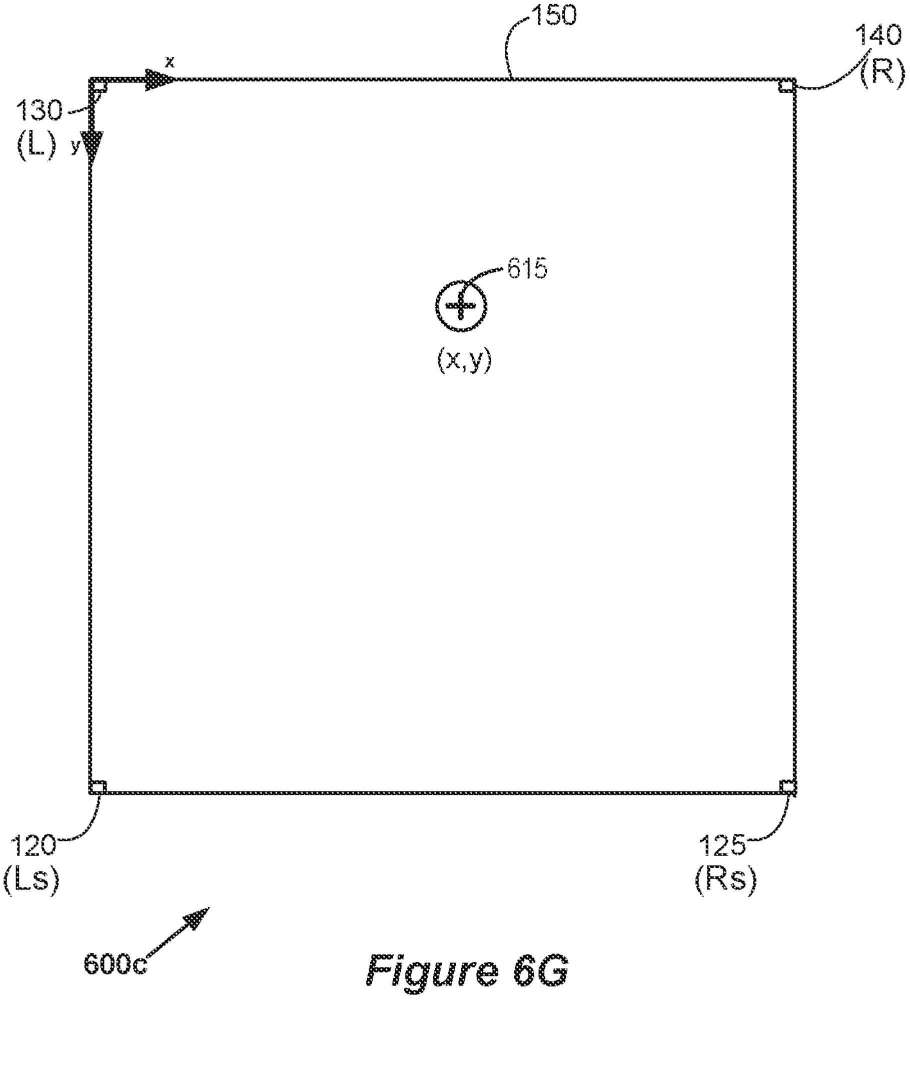
FIG. 6G illustrates an example of a reproduction environment having one speaker at each corner of a square having an edge length equal to 1.

FIG. 6G illustrates an example of a reproduction environment having one speaker at each corner of a square having an edge length equal to 1. In this example, the origin (0,0) of the x-y axis is coincident with left (L) screen speaker 130. Accordingly, the right (R) screen speaker 140 has coordinates (1,0), the left surround (Ls) speaker 120 has coordinates (0,1) and the right surround (Rs) speaker 125 has coordinates (1,1). The audio object position 615 (x,y) is x units to right of the L speaker and y units from the screen 150. In this example, each of the four speakers receives a factor cos/sin proportional to their distance along the x axis and the y axis. According to some implementations, the gains may be computed as follows:

$$G\_l(x)=\cos(pi/2*x) \text{ if } l=L,Ls$$

$$G\_l(x)=\sin(pi/2*x) \text{ if } l=R,Rs$$

$$G\_l(y)=\cos(pi/2*y) \text{ if } l=L,R$$

$$G\_l(y)=\sin(pi/2*y) \text{ if } l=Ls,Rs$$

The overall gain is the product: G_l(x,y)=G_l(x) G_l(y). In general, these functions depend on all the coordinates of all speakers. However, G_l(x) does not depend on the y-position of the source, and G_l(y) does not depend on its x-position. To illustrate a simple calculation, suppose that the audio object position 615 is (0,0), the location of the L speaker. G_L (x)=cos(0)=1. G_L (y)=cos(0)=1. The overall gain is the product: G_L(x,y)=G_L(x) G_L(y)=1. Similar calculations lead to G_Ls=G_Rs=G_R=0.

It may be desirable to blend between different panning modes as an audio object enters or leaves the virtual reproduction environment 400*a*. For example, a blend of gains computed according to near-field panning methods and far-field panning methods may be applied when the audio object 610 moves from the audio object location 615 shown in FIG. 6C to the audio object location 615 shown in FIG. 6D, or vice versa. In some implementations, a pair-wise panning law (e.g., an energy-preserving sine or power law) may be used to blend between the gains computed according to near-field panning methods and far-field panning methods. In alternative implementations, the pair-wise panning law may be amplitude-preserving rather than energy-preserving, such that the sum equals one instead of the sum of the squares being equal to one. It is also possible to blend the resulting processed signals, for example to process the audio signal using both panning methods independently and to cross-fade the two resulting audio signals.

Returning now to FIG. 5B, regardless of the algorithm used in block 530, the resulting gain values may be stored in a memory system (block 535), for use during run-time operations.

Figure 5C:
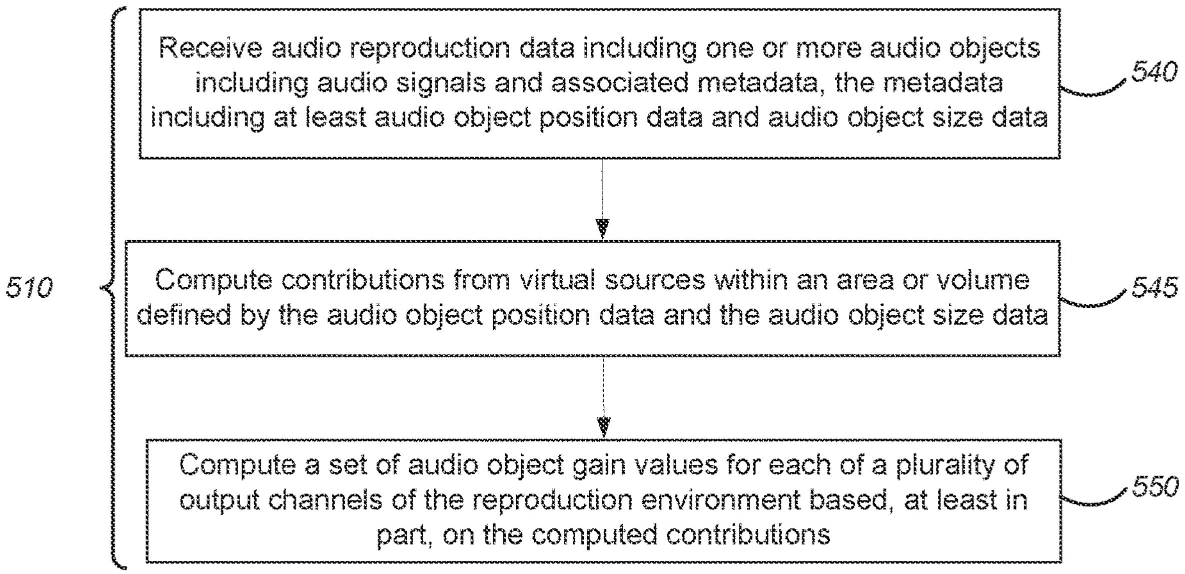
FIG. 5C is a flow diagram that provides an example of a run-time process of computing gain values for received audio objects according to pre-computed gain values for virtual source locations.

FIG. 5C is a flow diagram that provides an example of a run-time process of computing gain values for received audio objects according to pre-computed gain values for virtual source locations. All of the blocks shown in FIG. 5C are examples of processes that may be performed in block 510 of FIG. 5A.

In this example, the run-time process begins with the receipt of audio reproduction data that includes one or more audio objects (block 540). The audio objects include audio signals and associated metadata, including at least audio object position data and audio object size data in this example. Referring to FIG. 6A, for example, the audio object 610 is defined, at least in part, by an audio object position 615 and an audio object volume 620*a*. In this example, the received audio object size data indicate that the audio object volume 620*a* corresponds to that of a rectangular prism. In the example, shown in FIG. 6B, however, the received audio object size data indicate that the audio object volume 620*b* corresponds to that of a sphere. These sizes and shapes are merely examples; in alternative implementations, audio objects may have a variety of other sizes and/or shapes. In some alternative examples, the area or volume of an audio object may be a rectangle, a circle, an ellipse, an ellipsoid, or a spherical sector.

In this implementation, block 545 involves computing contributions from virtual sources within an area or volume defined by the audio object position data and the audio object size data. In the examples shown in FIGS. 6A and 6B, block 545 may involve computing contributions from the virtual sources at the virtual source locations 605 that are within the audio object volume 620*a* or the audio object volume 620*b*. If the audio object's metadata change over time, block 545 may be performed again according to the new metadata values. For example, if the audio object size and/or the audio object position changes, different virtual source locations 605 may fall within the audio object volume 620 and/or the virtual source locations 605 used in a prior computation may be a different distance from the audio object position 615. In block 545, the corresponding virtual source contributions would be computed according to the new audio object size and/or position.

In some examples, block 545 may involve retrieving, from a memory system, computed virtual source gain values for virtual source locations corresponding to an audio object position and size, and interpolating between the computed virtual source gain values. The process of interpolating between the computed virtual source gain values may involve determining a plurality of neighboring virtual source locations near the audio object position, determining computed virtual source gain values for each of the neighboring virtual source locations, determining a plurality of distances between the audio object position and each of the neighboring virtual source locations and interpolating between the computed virtual source gain values according to the plurality of distances.

The process of computing contributions from virtual sources may involve computing a weighted average of computed virtual source gain values for virtual source locations within an area or volume defined by the audio object's size. Weights for the weighted average may depend, for example, on the audio object's position, the audio object's size and each virtual source location within the area or volume.

Figure 7:
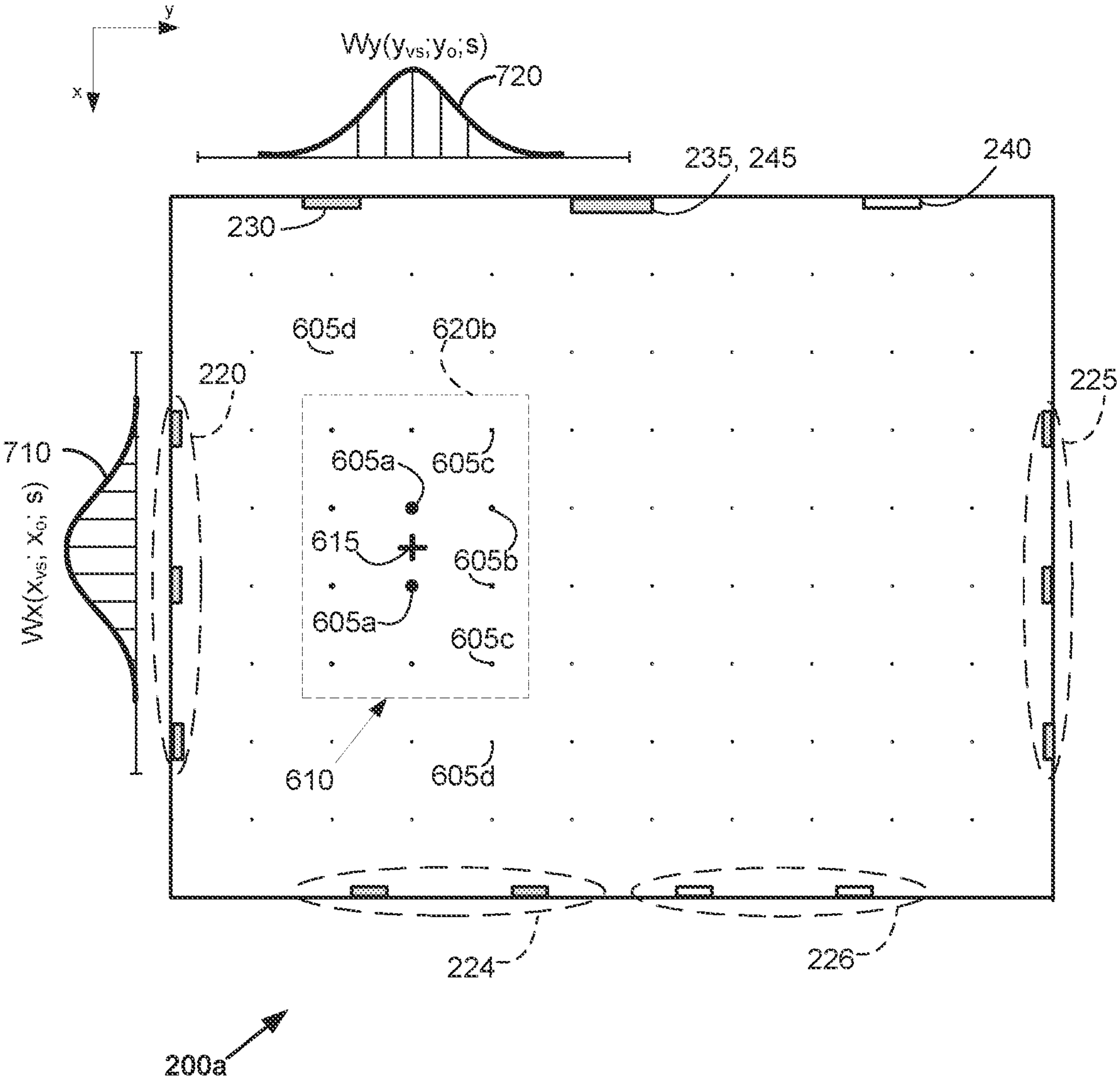
FIG. 7 shows an example of contributions from virtual sources within an area defined by audio object position data and audio object size data.

FIG. 7 shows an example of contributions from virtual sources within an area defined by audio object position data and audio object size data. FIG. 7 depicts a cross-section of an audio environment 200*a*, taken perpendicular to the z axis. Accordingly, FIG. 7 is drawn from the perspective of a viewer looking downward into the audio environment 200*a*, along the z axis. In this example, the audio environment 200*a* is a cinema sound system environment having a Dolby Surround 7.1 configuration such as that shown in FIG. 2 and described above. Accordingly, the reproduction environment 200*a* includes the left side surround speakers 220, the left rear surround speakers 224, the right side surround speakers 225, the right rear surround speakers 226, the left screen channel 230, the center screen channel 235, the right screen channel 240 and the subwoofer 245.

The audio object 610 has a size indicated by the audio object volume 620*b*, a rectangular cross-sectional area of which is shown in FIG. 7. Given the audio object position 615 at the instant of time depicted in FIG. 7, 12 virtual source locations 605 are included in the area encompassed by the audio object volume 620*b* in the x-y plane. Depending on the extent of the audio object volume 620*b* in the z direction and the spacing of the virtual source locations 605 along the z axis, additional virtual source locations 605*s* may or may not be encompassed within the audio object volume 620*b*.

FIG. 7 indicates contributions from the virtual source locations 605 within the area or volume defined by the size of the audio object 610. In this example, the diameter of the circle used to depict each of the virtual source locations 605 corresponds with the contribution from the corresponding virtual source location 605. The virtual source locations 605*a* are closest to the audio object position 615 are shown as the largest, indicating the greatest contribution from the corresponding virtual sources. The second-largest contributions are from virtual sources at the virtual source locations 605*b*, which are the second-closest to the audio object position 615. Smaller contributions are made by the virtual source locations 605*c*, which are further from the audio object position 615 but still within the audio object volume 620*b*. The virtual source locations 605*d* that are outside of the audio object volume 620*b* are shown as being the smallest, which indicates that in this example the corresponding virtual sources make no contribution.

Returning to FIG. 5C, in this example block 550 involves computing a set of audio object gain values for each of a plurality of output channels based, at least in part, on the computed contributions. Each output channel may correspond to at least one reproduction speaker of the reproduction environment. Block 550 may involve normalizing the resulting audio object gain values. For the implementation shown in FIG. 7, for example, each output channel may correspond to a single speaker or a group of speakers.

The process of computing the audio object gain value for each of the plurality of output channels may involve determining a gain value ($g_l^{size}(x_o,y_o,z_o;s)$) for an audio object of size (s) to be rendered at location $x_o,y_o,z_o$. This audio object gain value may sometimes be referred to herein as an "audio object size contribution." According to some implementations, the audio object gain value ($g_l^{size}(x_o,y_o,z_o;s)$) may be expressed as:

$$\left[\sum_{x_{vs},y_{vs},z_{vs}} [w(x_{vs}, y_{vs}, z_{vs}; x_o, y_o, z_o; s) g_l(x_{vs}, y_{vs}, z_{vs})]^p\right]^{1/p}. \quad \text{(Equation 2)}$$

In Equation 2, ($x_{vs}$, $y_{vs}$, $z_{vs}$) represents a virtual source location, $g_l(x_{vs}, y_{vs}, z_{vs})$ represents a gain value for channel l for the virtual source location $x_{vs}$, $y_{vs}$, $z_{vs}$ and $w(x_{vs}, y_{vs}, z_{vs}; x_o, y_o, z_o; s)$ represents a weight for $g_l(x_{vs}, y_{vs}, z_{vs})$ that is determined, based at least in part, on the location ($x_o,y_o,z_o$) of the audio object, the size (s) of the audio object and the virtual source location ($x_{vs}$, $y_{vs}$, $z_{vs}$).

In some examples, the exponent p may have a value between 1 and 10. In some implementations, p may be a function of the audio object size s. For example, if s is relatively larger, in some implementations p may be relatively smaller. According to some such implementations, p may be determined as follows:

$$p=6, \text{ if } s \le 0.5$$

$$p=6+(-4)(s-0.5)/(s_{max}-0.5), \text{ if } s>0.5,$$

wherein $s_{max}$ corresponds to the maximum value of an internal scaled-up size $s_{internal}$ (described below) and wherein an audio object size s=1 may correspond with an audio object having a size (e.g., a diameter) equal to a length of one of the boundaries of the reproduction environment (e.g., equal to the length of one wall of the reproduction environment).

Depending in part on the algorithm(s) used to compute the virtual source gain values, it may be possible to simplify Equation 2 if the virtual source locations are uniformly distributed along an axis and if the weight functions and the gain functions are separable, e.g., as described above. If these conditions are met, then $g_l(x_{vs}, y_{vs}, z_{vs})$ may be expressed as $g_{lx}(x_{vs})g_{ly}(y_{vs})g_{lz}(z_{vs})$, wherein $g_{lx}(x_{vs})$, $g_{lx}(y_{vs})$ and $g_{lz}(z_{vs})$ represent independent gain functions of x, y and z coordinates for a virtual source's location.

Similarly, $w(x_{vs},y_{vs},z_{vs};x_o,y_o,z_o;s)$ may factor as $w_x(x_{vs};x_o;s)w_y(y_{vs};y_o;s)w_z(z_{vs};z_o;s)$, wherein $w_x(x_{vs}; x_o; s)$, $w_y(y_{vs}; y_o; s)$ and $w_z(z_{vs};z_o; s)$ represent independent weight functions of x, y and z coordinates for a virtual source's location. One such example is shown in FIG. 7. In this example, weight function 710, expressed as $w_x(x_{vs}; x_o; s)$, may be computed independently from weight function 720, expressed as $w_y(y_{vs}; x_o; s)$. In some implementations, the weight functions 710 and 720 may be gaussian functions, whereas the weight function $w_z(z_{vs}; z_o; s)$ may be a product of cosine and gaussian functions.

If $w(x_{vs}, y_{vs}, z_{vs}; x_o, y_o, z_o; s)$ can be factored as $w_x(x_{vs}; x_o; s)w_y(y_{vs}; y_o; s)w_z(z_{vs}; z_o; s)$, Equation 2 simplifies to:

$$[f_l^x(x_o;s)f_l^y(y_o;s)f_l^z(z_o;s)]^{1/p}, \text{ wherein}$$

$$f_l^x(x_o; s) = \sum_{x_s} [g_l(x_s) w(x_s; x_o; s)]^p,$$

-continued $$f_l^y(y_o; s) = \sum_{y_s}[g_l(y_s)w(y_s; y_0; s)]^p \text{ and}$$

$$f_l^z(z_o; s) = \sum_{z_s}[g_l(z_s)w(z_s; z_o; s)]^p.$$

The functions $f$ may contain all the required information regarding the virtual sources. If the possible object positions are discretized along each axis, one can express each function $f$ as a matrix. Each function $f$ may be pre-computed during the set-up process of block 505 (see FIG. 5A) and stored in a memory system, e.g., as a matrix or as a look-up table. At run-time (block 510), the look-up tables or matrices may be retrieved from the memory system. The run-time process may involve interpolating, given an audio object position and size, between the closest corresponding values of these matrices. In some implementations, the interpolation may be linear.

In some implementations, the audio object size contribution $g_l^{size}$ may be combined with the "audio object neargain" result for the audio object position. As used herein, the "audio object neargain" is a computed gain that is based on the audio object position 615. The gain computation may be made using the same algorithm used to compute each of the virtual source gain values. According to some such implementations, a cross-fade calculation may be performed between the audio object size contribution and the audio object neargain result, e.g., as a function of audio object size. Such implementations may provide smooth panning and smooth growth of audio objects, and may allow a smooth transition between the smallest and the largest audio object sizes. In one such implementation, $$g_l^{total}(x_o,y_o,z_o;s)=\alpha(s)g_l^{neargain}(x_o,y_o,z_o;s)+\beta(s)\tilde{g}_l^{size}(x_o,y_o,z_o;s), \text{ wherein}$$

$$s<s_{xfade},\ \alpha=\cos((s/s_{xfade})(\pi/2)),\ \beta=\sin((s/s_{xfade})(\pi/2))$$

$$s\geq s_{xfade},\ \alpha=0,\ \beta=1,$$

and wherein $\tilde{g}_l^{size}$ represents the normalized version of the previously computed $g_l^{size}$. In some such implementations, $s_{xfade}=0.2$. However, in alternative implementations, $s_{xfade}$ may have other values.

According to some implementations, the audio object size value may be scaled up in the larger portion of its range of possible values. In some authoring implementations, for example, a user may be exposed to audio object size values $s_{user}\in[0, 1]$ which are mapped into the actual size used by the algorithm to a larger range, e.g., the range $[0, s_{max}]$, wherein $s_{max}>1$. This mapping may ensure that when size is set to maximum by the user, the gains become truly independent of the object's position. According to some such implementations, such mappings may be made according to a piece-wise linear function that connects pairs of points $(s_{user}, s_{internal})$, wherein $s_{user}$ represents a user-selected audio object size and $s_{internal}$ represents a corresponding audio object size that is determined by the algorithm. According to some such implementations, the mapping may be made according to a piece-wise linear function that connects pairs of points (0, 0), (0.2, 0.3), (0.5, 0.9), (0.75, 1.5) and (1, $s_{max}$). In one such implementation, $s_{max}=2.8$.

Figure 8A:
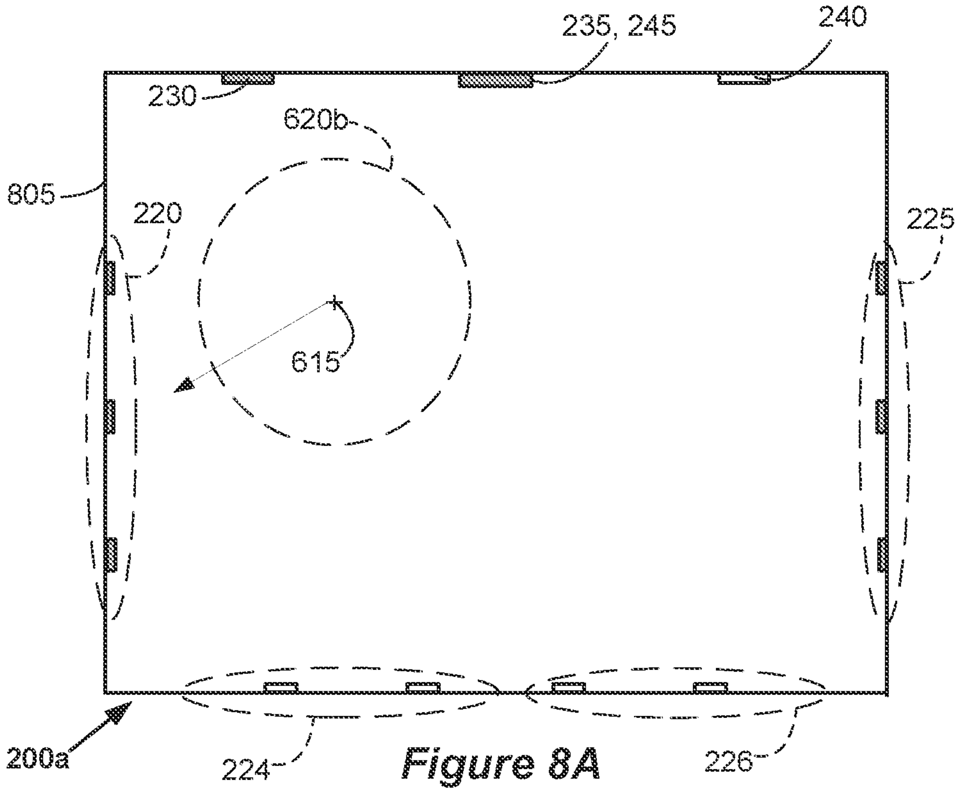
FIGS. 8A and 8B show an audio object in two positions within a reproduction environment.
Figure 8B:
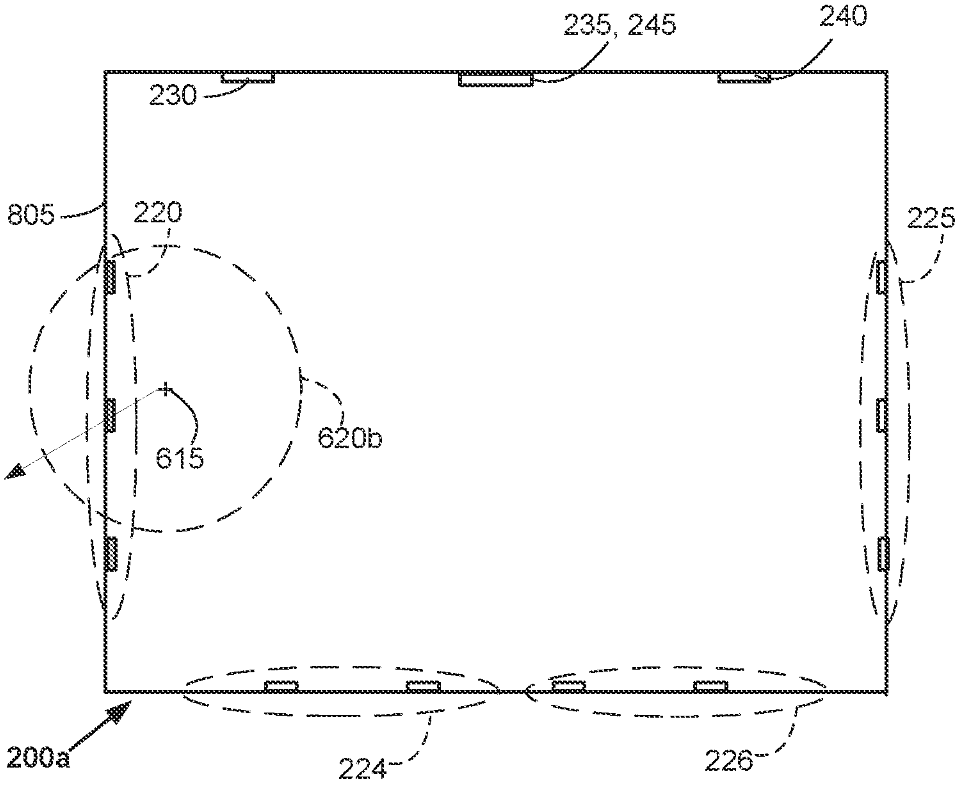

FIGS. 8A and 8B show an audio object in two positions within a reproduction environment. In these examples, the audio object volume 620*b* is a sphere having a radius of less than half of the length or width of the reproduction environment 200*a*. The reproduction environment 200*a* is configured according to Dolby 7.1. At the instant of time depicted in FIG. 8A, the audio object position 615 is relatively closer to the middle of the reproduction environment 200*a*. At the time depicted in FIG. 8B, the audio object position 615 has moved close to a boundary of the reproduction environment 200*a*. In this example, the boundary is a left wall of a cinema and coincides with the locations of the left side surround speakers 220.

For aesthetical reasons, it may be desirable to modify audio object gain calculations for audio objects that are approaching a boundary of a reproduction environment. In FIGS. 8A and 8B, for example, no speaker feed signals are provided to speakers on an opposing boundary of the reproduction environment (here, the right side surround speakers 225) when the audio object position 615 is within a threshold distance from the left boundary 805 of the reproduction environment. In the example shown in FIG. 8B, no speaker feed signals are provided to speakers corresponding to the left screen channel 230, the center screen channel 235, the right screen channel 240 or the subwoofer 245 when the audio object position 615 is within a threshold distance (which may be a different threshold distance) from the left boundary 805 of the reproduction environment, if the audio object position 615 is also more than a threshold distance from the screen.

In the example shown in FIG. 8B, the audio object volume 620*b* includes an area or volume outside of the left boundary 805. According to some implementations, a fade-out factor for gain calculations may be based, at least in part, on how much of the left boundary 805 is within the audio object volume 620*b* and/or on how much of the area or volume of an audio object extends outside such a boundary.

Figure 9:
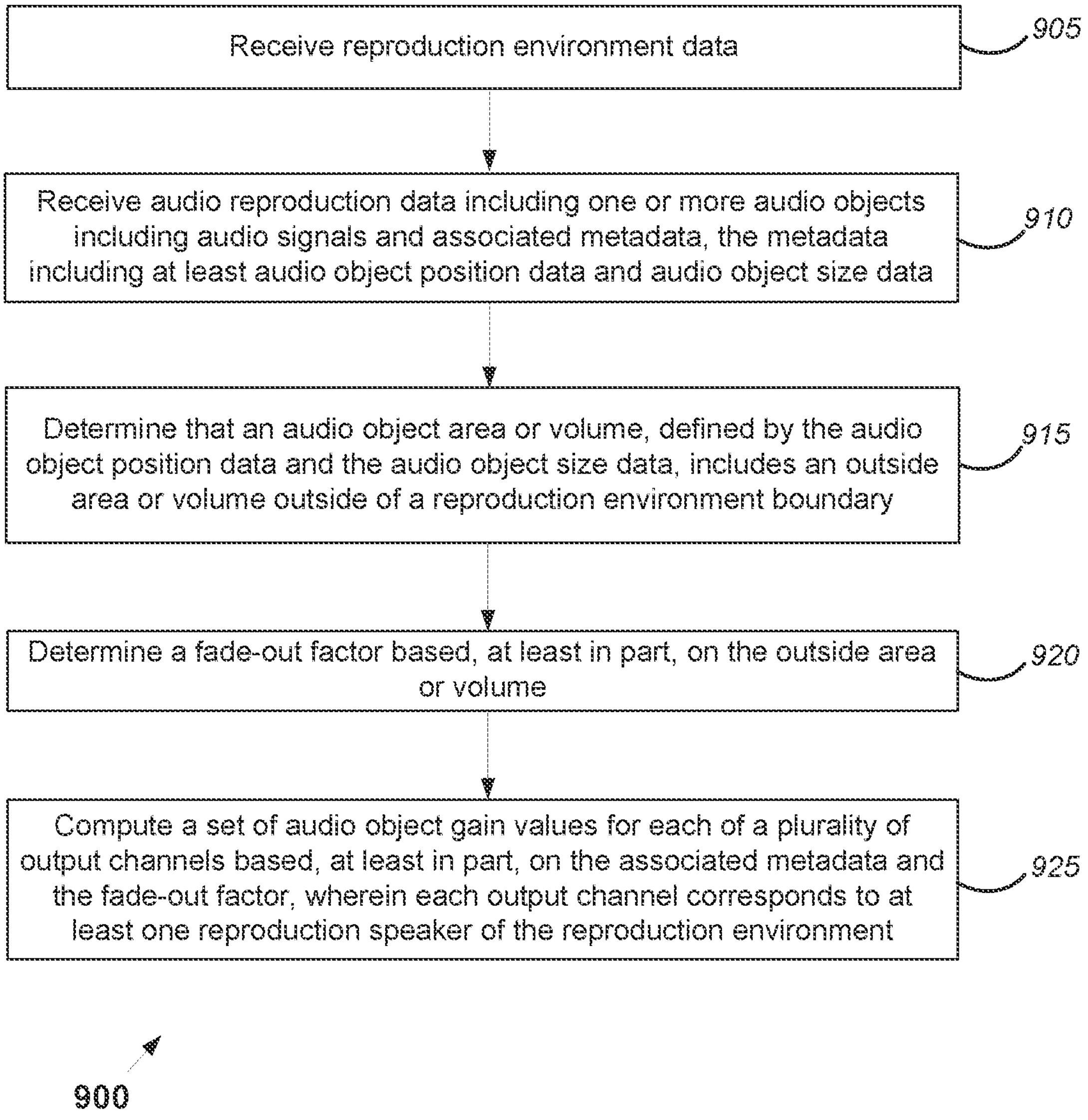
FIG. 9 is a flow diagram that outlines a method of determining a fade-out factor based, at least in part, on how much of an area or volume of an audio object extends outside a boundary of a reproduction environment.

FIG. 9 is a flow diagram that outlines a method of determining a fade-out factor based, at least in part, on how much of an area or volume of an audio object extends outside a boundary of a reproduction environment. In block 905, reproduction environment data are received. In this example, the reproduction environment data include reproduction speaker location data and reproduction environment boundary data. Block 910 involves receiving audio reproduction data including one or more audio objects and associated metadata. The metadata includes at least audio object position data and audio object size data in this example.

In this implementation, block 915 involves determining that an audio object area or volume, defined by the audio object position data and the audio object size data, includes an outside area or volume outside of a reproduction environment boundary. Block 915 also may involve determining what proportion of the audio object area or volume is outside the reproduction environment boundary.

In block 920, a fade-out factor is determined. In this example, the fade-out factor may be based, at least in part, on the outside area. For example, the fade-out factor may be proportional to the outside area.

In block 925, a set of audio object gain values may be computed for each of a plurality of output channels based, at least in part, on the associated metadata (in this example, the audio object position data and the audio object size data) and the fade-out factor. Each output channel may correspond to at least one reproduction speaker of the reproduction environment.

In some implementations, the audio object gain computations may involve computing contributions from virtual sources within an audio object area or volume. The virtual sources may correspond with plurality of virtual source locations that may be defined with reference to the reproduction environment data. The virtual source locations may or may not be spaced uniformly. For each of the virtual source locations, a virtual source gain value may be computed for each of the plurality of output channels. As described above, in some implementations these virtual source gain values may be computed and stored during a set-up process, then retrieved for use during run-time operations.

In some implementations, the fade-out factor may be applied to all virtual source gain values corresponding to virtual source locations within a reproduction environment. In some implementations, $g_l^{size}$ may be modified as follows:

$$g_l^{size}=[g_l^{bound}+(\text{fade-out factor})\times g_l^{inside}]^{1/p}, \text{ wherein}$$

$$\text{fade-out factor}=1, \text{ if } d_{bound}\geq s,$$

$$\text{fade-out factor}=d_{bound}/s, \text{ if } d_{bound}<s$$

wherein $d_{bound}$ represents the minimum distance between an audio object location and a boundary of the reproduction environment and $g_l^{bound}$ rep resents the contribution of virtual sources along a boundary. For example, referring to FIG. 8B, $g_l^{bound}$ may represent the contribution of virtual sources within the audio object volume 620*b* and adjacent to the boundary 805. In this example, like that of FIG. 6A, there are no virtual sources located outside of the reproduction environment.

In alternative implementations, $g_l^{size}$ may be modified as follows:

$$g_l^{size}=[g_l^{outside}+(\text{fade-out factor})\times g_l^{inside}]^{1/p},$$

wherein $g_l^{outside}$ represents audio object gains based on virtual sources located outside of a reproduction environment but within an audio object area or volume. For example, referring to FIG. 8B, $g_l^{outside}$ may represent the contribution of virtual sources within the audio object volume 620*b* and outside of the boundary 805. In this example, like that of FIG. 6B, there are virtual sources both inside and outside of the reproduction environment.

Figure 10:
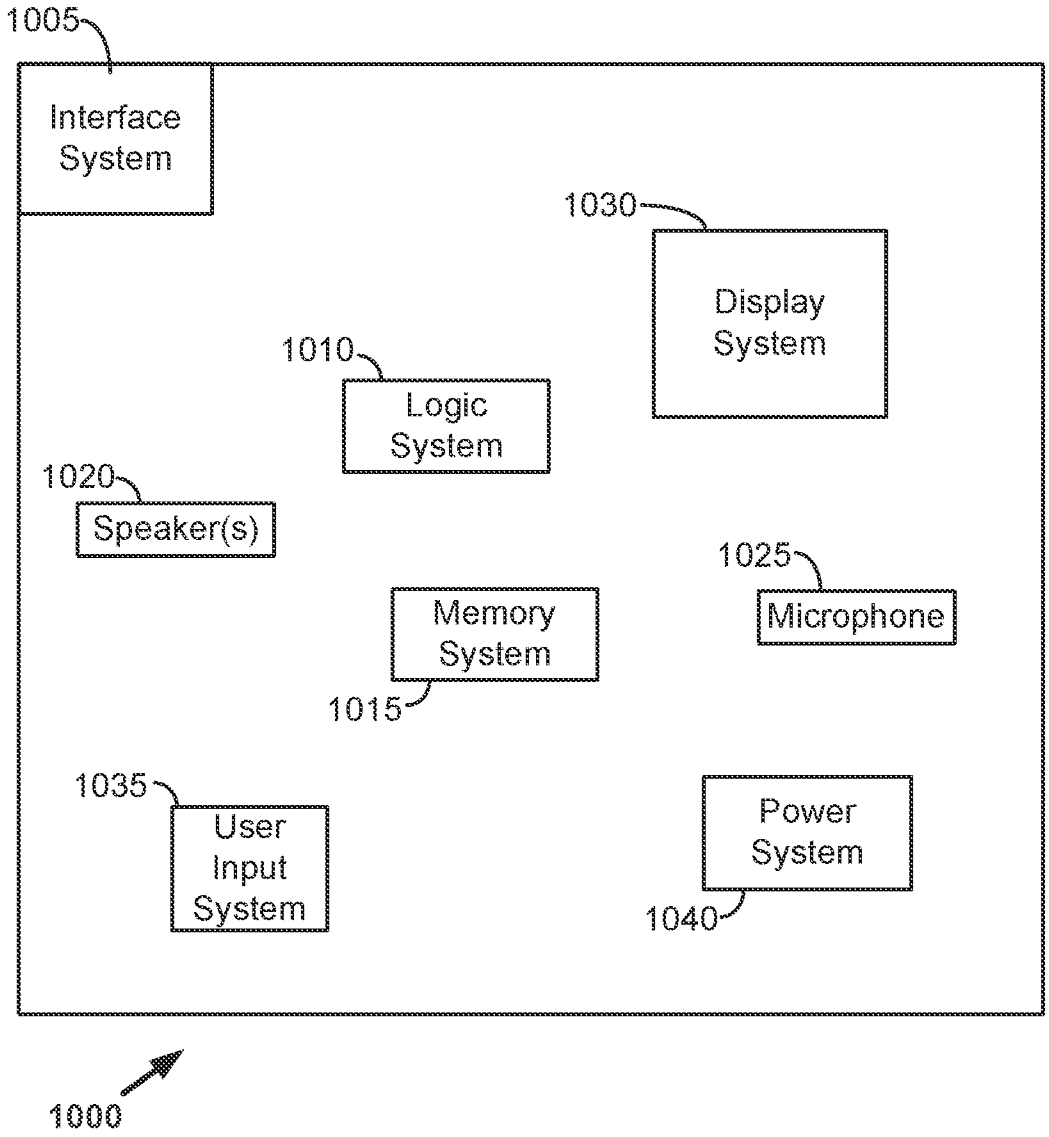
FIG. 10 is a block diagram that provides examples of components of an authoring and/or rendering apparatus.

FIG. 10 is a block diagram that provides examples of components of an authoring and/or rendering apparatus. In this example, the device 1000 includes an interface system 1005. The interface system 1005 may include a network interface, such as a wireless network interface. Alternatively, or additionally, the interface system 1005 may include a universal serial bus (USB) interface or another such interface.

The device 1000 includes a logic system 1010. The logic system 1010 may include a processor, such as a general purpose single- or multi-chip processor. The logic system 1010 may include a digital signal processor (DSP), an application specific integrated circuit (ASIC), a field programmable gate array (FPGA) or other programmable logic device, discrete gate or transistor logic, or discrete hardware components, or combinations thereof. The logic system 1010 may be configured to control the other components of the device 1000. Although no interfaces between the components of the device 1000 are shown in FIG. 10, the logic system 1010 may be configured with interfaces for communication with the other components. The other components may or may not be configured for communication with one another, as appropriate.

The logic system 1010 may be configured to perform audio authoring and/or rendering functionality, including but not limited to the types of audio authoring and/or rendering functionality described herein. In some such implementations, the logic system 1010 may be configured to operate (at least in part) according to software stored in one or more non-transitory media. The non-transitory media may include memory associated with the logic system 1010, such as random access memory (RAM) and/or read-only memory (ROM). The non-transitory media may include memory of the memory system 1015. The memory system 1015 may include one or more suitable types of non-transitory storage media, such as flash memory, a hard drive, etc.

The display system 1030 may include one or more suitable types of display, depending on the manifestation of the device 1000. For example, the display system 1030 may include a liquid crystal display, a plasma display, a bistable display, etc.

The user input system 1035 may include one or more devices configured to accept input from a user. In some implementations, the user input system 1035 may include a touch screen that overlays a display of the display system 1030. The user input system 1035 may include a mouse, a track ball, a gesture detection system, a joystick, one or more GUIs and/or menus presented on the display system 1030, buttons, a keyboard, switches, etc. In some implementations, the user input system 1035 may include the microphone 1025: a user may provide voice commands for the device 1000 via the microphone 1025. The logic system may be configured for speech recognition and for controlling at least some operations of the device 1000 according to such voice commands.

The power system 1040 may include one or more suitable energy storage devices, such as a nickel-cadmium battery or a lithium-ion battery. The power system 1040 may be configured to receive power from an electrical outlet.

Figure 11A:
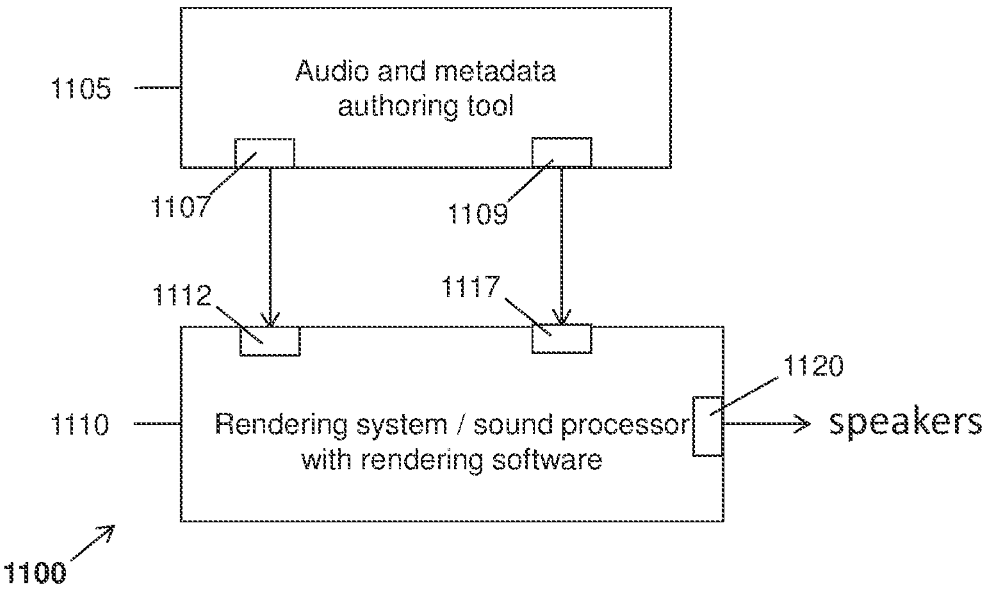
FIG. 11A is a block diagram that represents some components that may be used for audio content creation.

FIG. 11A is a block diagram that represents some components that may be used for audio content creation. The system 1100 may, for example, be used for audio content creation in mixing studios and/or dubbing stages. In this example, the system 1100 includes an audio and metadata authoring tool 1105 and a rendering tool 1110. In this implementation, the audio and metadata authoring tool 1105 and the rendering tool 1110 include audio connect interfaces 1107 and 1112, respectively, which may be configured for communication via AES/EBU, MADI, analog, etc. The audio and metadata authoring tool 1105 and the rendering tool 1110 include network interfaces 1109 and 1117, respectively, which may be configured to send and receive metadata via TCP/IP or any other suitable protocol. The interface 1120 is configured to output audio data to speakers.

The system 1100 may, for example, include an existing authoring system, such as a Pro Tools™ system, running a metadata creation tool (i.e., a panner as described herein) as a plugin. The panner could also run on a standalone system (e.g., a PC or a mixing console) connected to the rendering tool 1110, or could run on the same physical device as the rendering tool 1110. In the latter case, the panner and renderer could use a local connection, e.g., through shared memory. The panner GUI could also be provided on a tablet device, a laptop, etc. The rendering tool 1110 may comprise a rendering system that includes a sound processor that is configured for executing rendering methods like the ones described in FIGS. 5A-C and FIG. 9. The rendering system may include, for example, a personal computer, a laptop, etc., that includes interfaces for audio input/output and an appropriate logic system.

Figure 11B:
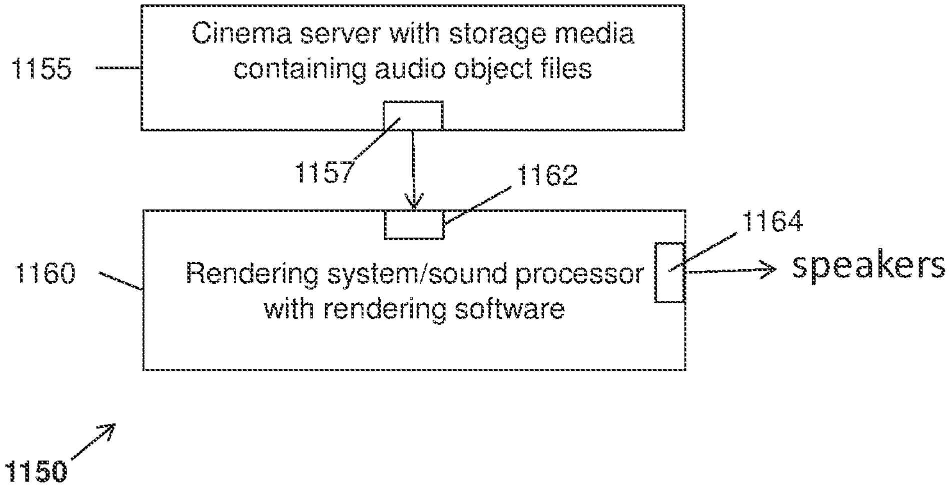
FIG. 11B is a block diagram that represents some components that may be used for audio playback in a reproduction environment.

FIG. 11B is a block diagram that represents some components that may be used for audio playback in a reproduction environment (e.g., a movie theater). The system 1150 includes a cinema server 1155 and a rendering system 1160 in this example. The cinema server 1155 and the rendering system 1160 include network interfaces 1157 and 1162, respectively, which may be configured to send and receive audio objects via TCP/IP or any other suitable protocol. The interface 1164 is configured to output audio data to speakers.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method for rendering input audio including an audio object and metadata, wherein the metadata includes audio object size metadata and audio object position metadata corresponding to the audio object, the method comprising:

receiving the audio object size metadata and the audio object position metadata;

receiving zone metadata regarding zone constraints for one or more speaker feeds;

determining the at least a virtual audio object based on the input audio, the audio object size metadata and the audio object position metadata;

determining a location of the at least a virtual audio object based on at least one of the audio object size metadata and the audio object position metadata; and rendering the audio object to the one or more speaker feeds based on the location of the at least a virtual audio object, and wherein the rendering is further based on the zone metadata.

2. A non-transitory medium having software, stored thereon, the software including instructions for performing the method of claim 1.

3. An apparatus for rendering input audio including an audio object and metadata, wherein the metadata includes audio object size metadata and audio object position metadata corresponding to the audio object, the apparatus comprising:

a receiver configured to receive the audio object size metadata and the audio object position metadata, wherein the receiver is further configured to receive zone metadata regarding zone constraints for one or more speaker feeds;

a first processor for determining the at least a virtual audio object based on the input audio, the audio object size metadata and the audio object position metadata;

a second processor for determining a location of the at least a virtual audio object based on at least one of the audio object size metadata and the audio object position metadata; and a renderer for rendering the audio object to one or more speaker feeds based on the location of the at least a virtual audio object, and wherein the rendering is further based on the zone metadata.

* * * * *